United States Patent [19]
Inoue et al.

[11] Patent Number: 5,506,674
[45] Date of Patent: Apr. 9, 1996

[54] METHOD FOR IDENTIFYING AN OPTICAL FIBER USING A PATTERN OF REFLECTED LIGHT

[75] Inventors: Akira Inoue; Yasuji Hattori, both of Yokohama; Katsuya Yamashita, Mito; Fumio Ohtsuki, Mito; Yutaka Katsuyama, Mito, all of Japan

[73] Assignees: Sumitomo Electric Industries, Ltd., Osaka; Nippon Telegraph & Telephone Corporation, Tokyo, Japan

[21] Appl. No.: 170,297

[22] PCT Filed: Apr. 28, 1993

[86] PCT No.: PCT/JP93/00567

§ 371 Date: Dec. 30, 1993

§ 102(e) Date: Dec. 30, 1993

[87] PCT Pub. No.: WO93/22647

PCT Pub. Date: Nov. 11, 1993

[30] Foreign Application Priority Data

| May 1, 1992 | [JP] | Japan | 4-112797 |
| May 1, 1992 | [JP] | Japan | 4-112804 |
| May 1, 1992 | [JP] | Japan | 4-112805 |
| May 1, 1992 | [JP] | Japan | 4-112808 |
| May 1, 1992 | [JP] | Japan | 4-112818 |
| May 1, 1992 | [JP] | Japan | 4-112820 |
| May 1, 1992 | [JP] | Japan | 4-112822 |

[51] Int. Cl.⁶ ............................. G01N 21/84
[52] U.S. Cl. ............................. 356/173.1
[58] Field of Search ..................... 356/73.1

[56] References Cited

U.S. PATENT DOCUMENTS 5,187,546  2/1993  Johnston .................. 356/419 X

FOREIGN PATENT DOCUMENTS

| 65868 | 6/1987 | Australia. | |
| 983/90 | 8/1990 | Australia. | |
| 982/90 | 8/1990 | Australia. | |
| 981/90 | 8/1990 | Australia. | |
| 978/90 | 8/1990 | Australia. | |
| 220803 | 1/1990 | Japan. | |
| 2-141641 | 5/1990 | Japan | 356/73.1 |
| 2230106 | 9/1990 | Japan. | |
| 2230105 | 9/1990 | Japan. | |
| WO90/04803 | 5/1990 | WIPO. | |
| WO90/06498 | 6/1990 | WIPO | 356/73.1 |
| WO91/15906 | 10/1991 | WIPO | 385/36 |

OTHER PUBLICATIONS

Patent Abstracts of Japan, vol. 16, No. 308 (P–1381) Jul. 7, 1992 & JP-A-04 084 727 (NTT) Mar. 18, 1992.
Patent Abstracts of Japan, vol. 14, No. 452 (P–1112) Sep. 27, 1990 & JP-A-02 181 101 (Fujikura) Jul. 13, 1990.
Arakawa et al., "Optical Fiber Identifier for Dispersion-Shifted Fiber Cables", NTT Review, vol. 4, No. 2, Mar. 1992, pp. 53–56.

*Primary Examiner*—Vincent P. McGraw
*Attorney, Agent, or Firm*—Cushman Darby & Cushman

[57] ABSTRACT

The present invention is to provide a method for identifying an optical line easily and accurately regardless of the optical line length. A plurality of reflecting parts is placed on the optical line, and a combination of relative positions of the reflecting parts is changed for every optical line to form an identification code, and the relative positions of the reflecting parts are detected based on reflected lights when a detecting light is inputted to the optical line, so that the optical line is identified based on a result. Concretely, when the detecting light is inputted to one end of the optical line, the light is reflected at the plurality of the reflecting parts which form the identification code and comes back the input end. A combination of the relative positions etc. of the reflecting parts is changed for every optical line. To detect the relative positions of the reflecting parts which form the identification code, either the optical path difference of the reflected lights from the reflecting parts is measured or the time difference between the reflected lights come back from the reflecting parts is measured. Then, based on the result, the optical line can be identified.

21 Claims, 21 Drawing Sheets

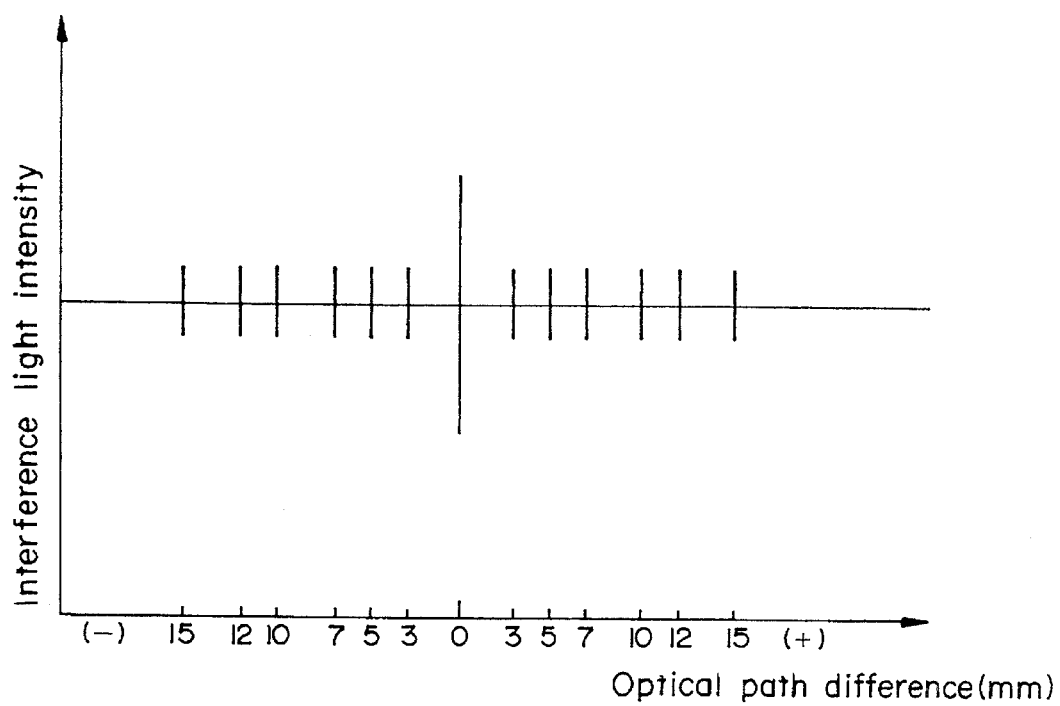

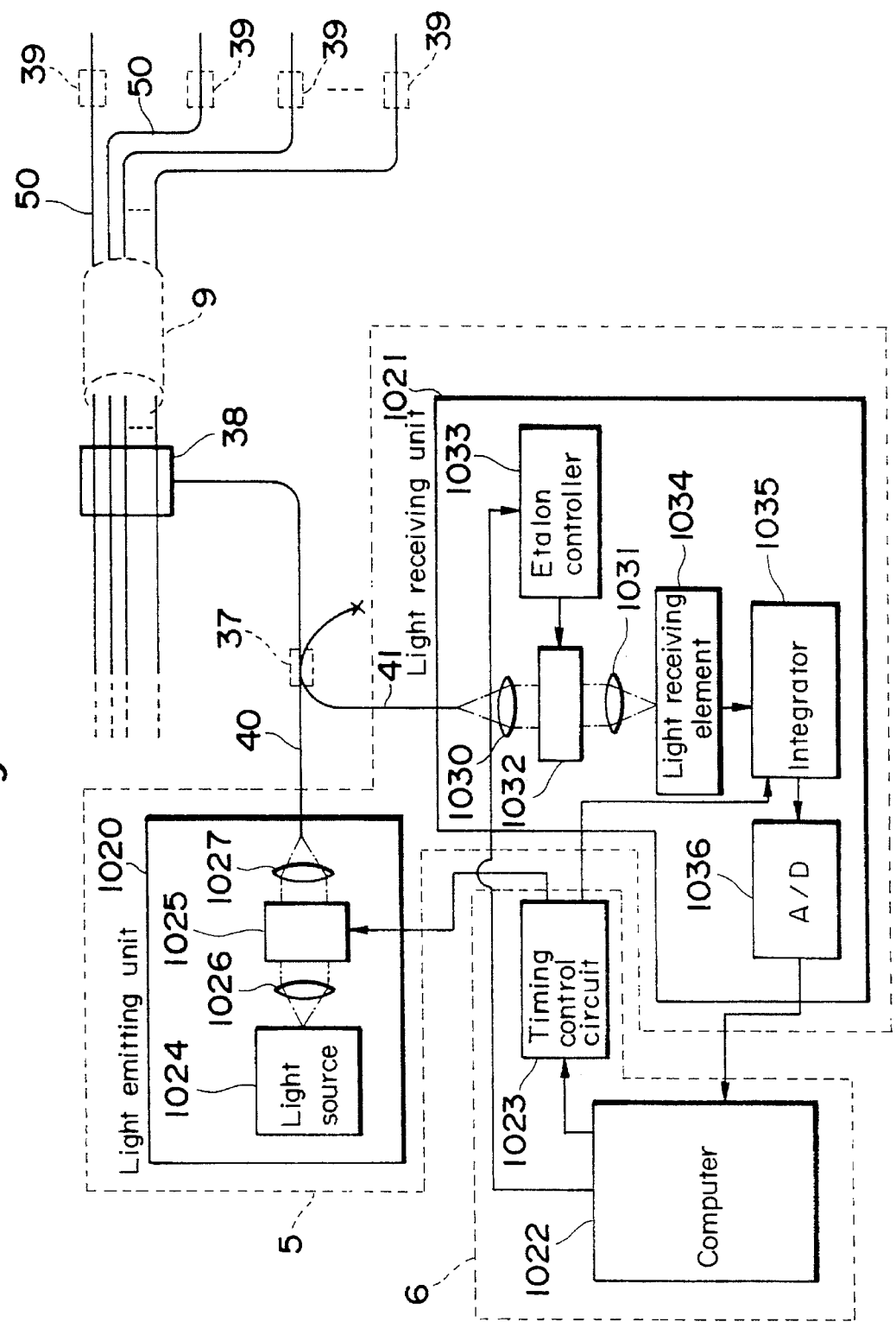

Fig. 10A
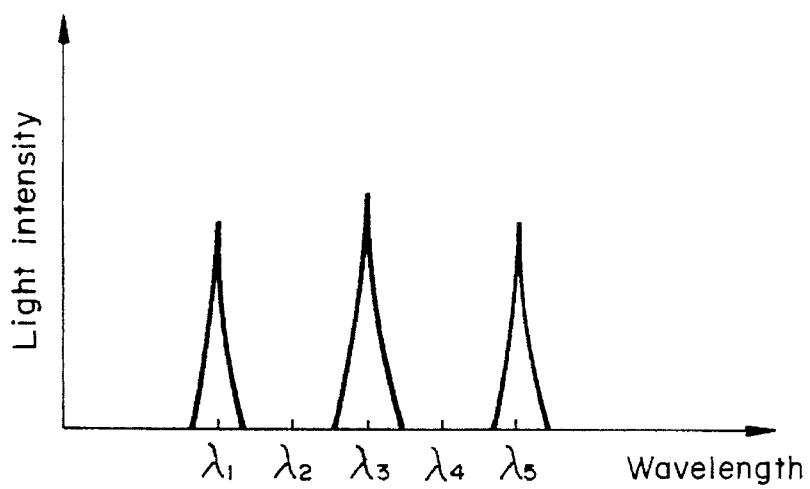
Fig. 10B
| Wavelength | $\lambda_1$ | $\lambda_2$ | $\lambda_3$ | $\lambda_4$ | $\lambda_5$ |
|---|---|---|---|---|---|
| Code | 1 | 0 | 1 | 0 | 1 |
Fig. 11
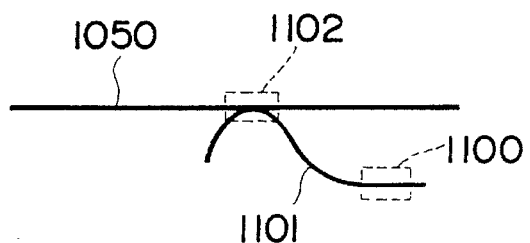

| Wavelength | $\lambda_1$ | $\lambda_2$ | $\lambda_3$ | $\lambda_4$ | $\lambda_5$ |
|---|---|---|---|---|---|
| Code | 1 | 0 | 3 | 0 | 2 |

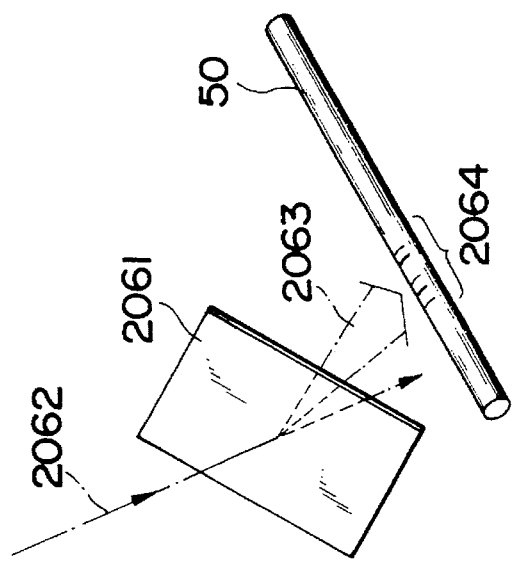
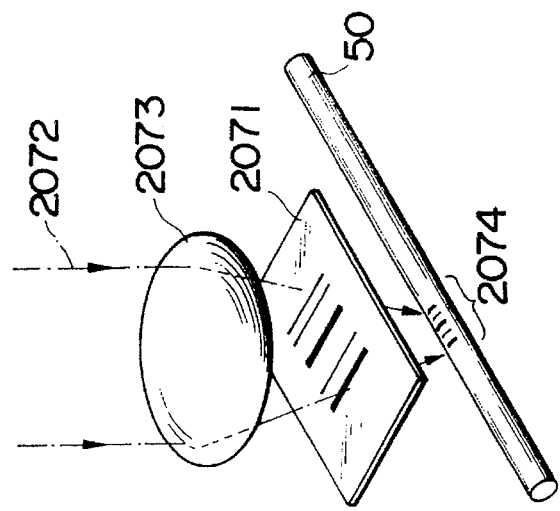
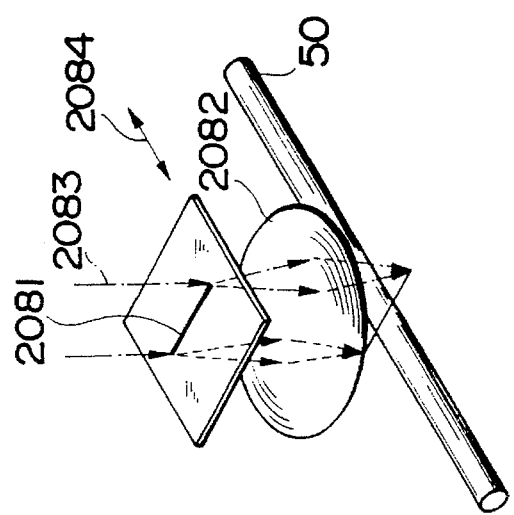

| Wavelength | $\lambda_1$ | $\lambda_2$ | $\lambda_3$ | $\lambda_4$ | $\lambda_5$ | | ------- | $\lambda_n$ |
|---|---|---|---|---|---|---|---|---|
| Code | 0 | 1 | 1 | 0 | 0 | | ------- | 1 |

Fig. 19

| Wavelength | Corresponding code | Position of reflecting point | | | | | |
|---|---|---|---|---|---|---|---|
| | | 1 | 2 | 3 | ------ | m-1 | m |
| $\lambda_1$ | 1 | | ○ | | | | |
| $\lambda_2$ | 2 | ○ | | | | | |
| $\lambda_3$ | 3 | | | ○ | | | |
| ⋮ | ⋮ | | | | | | |
| $\lambda_{n-1}$ | n-1 | | | | | | |
| $\lambda_n$ | n | | | | | | |

Reading code: 2 1 3 ------

Fig.21A
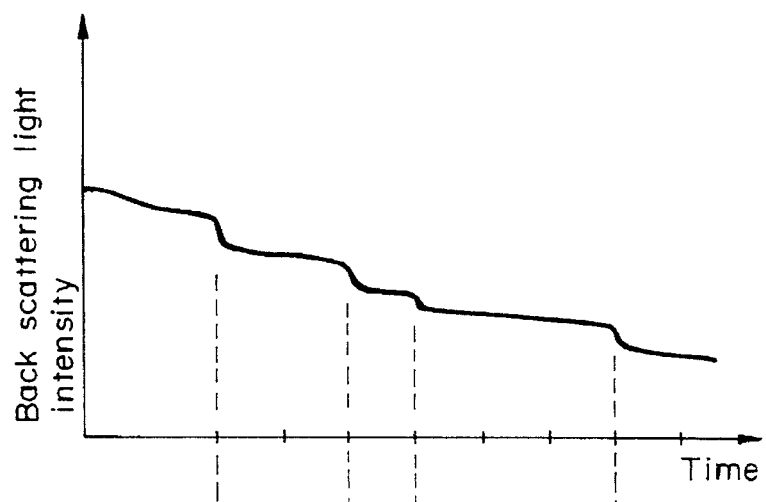
Fig.21B
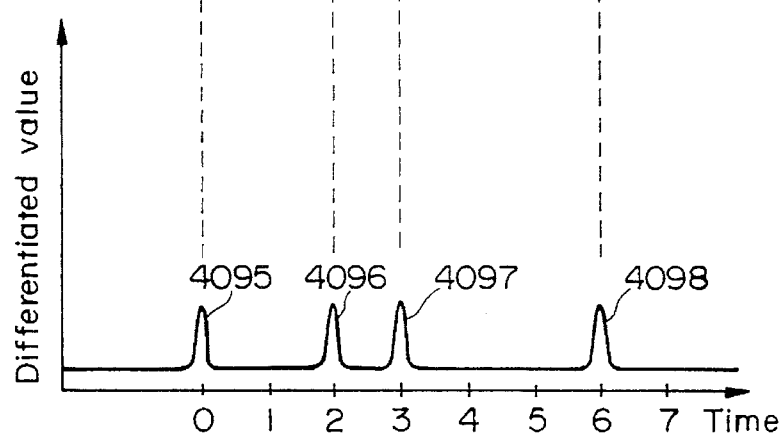
Fig.21C
| Position of bending loss | 1 | 2 | 3 | 4 | 5 | 6 | 7 |
|---|---|---|---|---|---|---|---|
| Code | 0 | 1 | 1 | 0 | 0 | 1 | 0 |

Fig. 24

| Code number | 1 | 2 | 3 | 4 | 5 | 6 | 7 | 8 |
|---|---|---|---|---|---|---|---|---|
| Existence of reflecting part | YES | NO | YES | YES | NO | YES | NO | YES |
| Code | 1 | 0 | 1 | 1 | 0 | 1 | 0 | 1 |

METHOD FOR IDENTIFYING AN OPTICAL FIBER USING A PATTERN OF REFLECTED LIGHT

TECHNICAL FIELD

This invention relates to a method for identifying an optical line at one end thereof which is used in optical communication system.

BACKGROUND ART

A method for identifying an optical line by varying a refractive index of an optical line core in part, and detecting a position of the varied refractive index part at one end of the optical line using the OTDR method has been known ("Remote Fiber Discrimination Method for an Optical Transmission Line Database", 1991, DENSI JYOUHOU TSUSIN GAKKAI SHUKI TAIKAI, Reference B-591).

However, according to this method, an identification code composed of the varied refractive index parts on the optical line extends over hundreds meters. For instance, in an example of the reference described above, to record a 8 bits identification code on the optical line requires a 50m for a bit and a total of 400m. Accordingly, it is difficult to apply the identification code to a short optical line. Recording the identification code extending over hundreds meters on the optical line has to be done during a manufacturing process of the optical line, which is not practical.

DISCLOSURE OF THE INVENTION

An object of this invention is to provide a method for identifying an optical line easily and accurately regardless of the optical line length.

In order to achieve the object, a first method of the present invention comprises the steps of:

forming a plurality of the reflecting parts on each optical line as an identification code, the each optical line having a specific combination of relative positions of the reflecting parts;

detecting the relative positions of the reflecting parts based on reflected lights when a detecting light is inputted to the optical line; and identifying the optical line based on a result of the detecting step.

When the detecting light is inputted to one end of the optical line, the light is reflected at the plurality of the reflecting parts, and comes back to the input end. A combination of the relative positions of the reflecting parts is changed for every optical line. To detect the relative positions of the reflecting parts forming an identification code, either the optical path difference of the reflected lights is measured with the interferometer or the time difference between the reflected lights coming back from the reflecting parts is measured, so that the optical line can be identified based on the result.

A second method of the present invention comprises the steps of:

forming a plurality of the reflecting parts on each optical line as an identification code, the each reflecting part reflecting a light having a specific wavelength, and the each optical line having a specific combination of the specific reflecting wavelengths;

detecting wavelengths of the reflected lights when a detecting light is inputted to optical line; and identifying the optical line based on a result of the detecting step.

When the detecting light is inputted to one end of the optical line, the light is reflected at the reflecting parts which form an identification code and comes back to the input end. As a combination of the wavelengths of the reflected lights at the reflecting parts is changed for every optical line, the wavelengths of the reflected lights are measured, so that the optical line can be identified based on the result.

A third method of the present invention comprises the steps of:

forming a plurality of the reflecting parts on each optical line as an identification code, the each reflecting part reflecting a light having a specific wavelength, and the each optical line having a specific combination of the specific reflecting wavelengths and reflectances;

detecting wavelengths and reflectances of the reflected lights when a detecting light is inputted to optical line; and identifying the optical line based on a result of the detecting step.

When the detecting light is inputted to one end of the optical line, the light is reflected at the reflecting parts which form an identification code and comes back to the input end. As a combination of the wavelengths and reflectances of the reflecting parts is changed for every optical line, the wavelengths and the light intensities of the reflected lights are measured, and based on the result, the optical line can be identified.

A fourth method of the present invention comprises the steps of:

forming a reflecting part on each optical line as an identification code, the reflecting part on the each optical line having a specific reflectance characteristic depending on a wavelength;

detecting reflected light spectra coming back from reflecting part when a detecting light is inputted to the optical line; and identifying the optical line based on a result of the detecting step.

When the detecting light is inputted to one end of the optical line, the light is reflected at the reflecting parts which form an identification code and comes back to the input end. As a reflectance characteristic depending on a wavelength of the reflecting parts is changed for every optical line, the reflected light spectra are measured, and based on the result, the optical line can be identified.

A fifth method of the present invention comprises the steps of:

forming a plurality of the reflecting parts on each optical line as an identification code, the each reflecting part reflecting a light having a specific wavelength, and the each optical line having a specific combination of the specific reflecting wavelengths and relative positions of the reflecting parts;

detecting wavelengths and relative positions of the reflected lights when a detecting light is inputted to optical line; and identifying the optical line based on a result of the detecting step.

When the detecting light is inputted to one end of the optical line, the light is reflected at the reflecting parts which form an identification code and comes back to the input end. As a combination of the specific wavelengths and relative positions of the reflecting parts is changed for every optical line, the wavelengths and arrival times of the reflected lights from the identification code are measured, and based on the result, the optical line can be identified.

A sixth method of the present invention comprises the steps of:

forming a plurality of bending loss parts on each optical line as an identification code, the each optical line has a specific combination of relative positions of the plurality;

detecting the relative positions of the plurality based on a backscattering when a detecting light is inputted to the optical line; and identifying the optical line based on a result of the detecting step.

When the detecting light is inputted to one end of the optical line, the light is reflected at the reflecting parts which form an identification code and comes back to the input end. As a combination of the bending loss parts is changed for every optical line, a time difference between the backscattering lights coming back from the identification code is measured to detect the relative positions of the bending loss parts, and based on the result, the optical line can be identified.

A seventh method of the present invention comprises the steps of:

forming reflecting parts on the core optical lines of the multicore optical line selectively as an identification code, the each multicore optical line having a specific combination of existences of the reflecting parts and characteristics of reflections;

detecting reflected lights when detecting lights are inputted to the multicore optical line;

identifying the multicore optical line based on a result of the detecting step.

When the detecting light is inputted to one end of the multicore optical line, the light is reflected at the reflecting parts which form an identification code and comes back to the input end. As a combination of the existence of the reflecting parts on every core optical fiber is changed for every multicore optical line, the existence of the reflected lights on the core optical fibers is measured, so that the optical line can be identified.

In the first to seventh method, the identification code is placed directly on the optical line, but instead of this, it is possible to apply a branch optical line having the identification code to the optical line.

BRIEF DESCRIPTION OF THE DRAWINGS

FIG. 4A and FIG. 4B show a method for converting an interferogram to a binary code information.

FIG. 8 is a block diagram of an inner structure of a code reading device and its peripheral devices according to embodiments of the second, third, and fourth invention.

FIG. 10A is a graphic representation which shows a method for converting a reflected light to a binary code information according to the embodiments of the second and fifth invention.

FIG. 10B is a table which shows a method for converting a reflected light to a binary code information according to the embodiments of the second and fifth invention.

FIG. 11 shows a branch optical line on which an information code is formed.

FIG. 16A is a perspective view which shows a method for writing down an identification code according to the embodiments of the second, third, fourth, and fifth invention.

FIG. 16B is a perspective view which shows a method for writing down an identification code according to the embodiments of the second, third, fourth, and fifth invention.

FIG. 16C is a perspective view which shows a method for writing down an identification code according to the embodiments of the second, third, fourth and fifth invention.

FIG. 19 shows a method for converting a reflected light to a code information according to the embodiment of the fifth invention.

FIG. 21A is a graphic representative which shows a method for converting a backscattering light intensity to a binary code information according to the embodiment of the sixth invention.

FIG. 21B is a representative which shows a method for converting a backscattering light intensity to a binary code information according to the embodiment of the sixth invention.

FIG. 21C is a table which shows a method for converting a backscattering light intensity to a binary code information according to the embodiment of the sixth invention.

FIG. 24 is a table which shows a method for converting existences of reflecting parts to a binary code information according to the embodiment of the seventh invention.

BEST MODE FOR CARRYING OUT THE INVENTION

Figure 1:
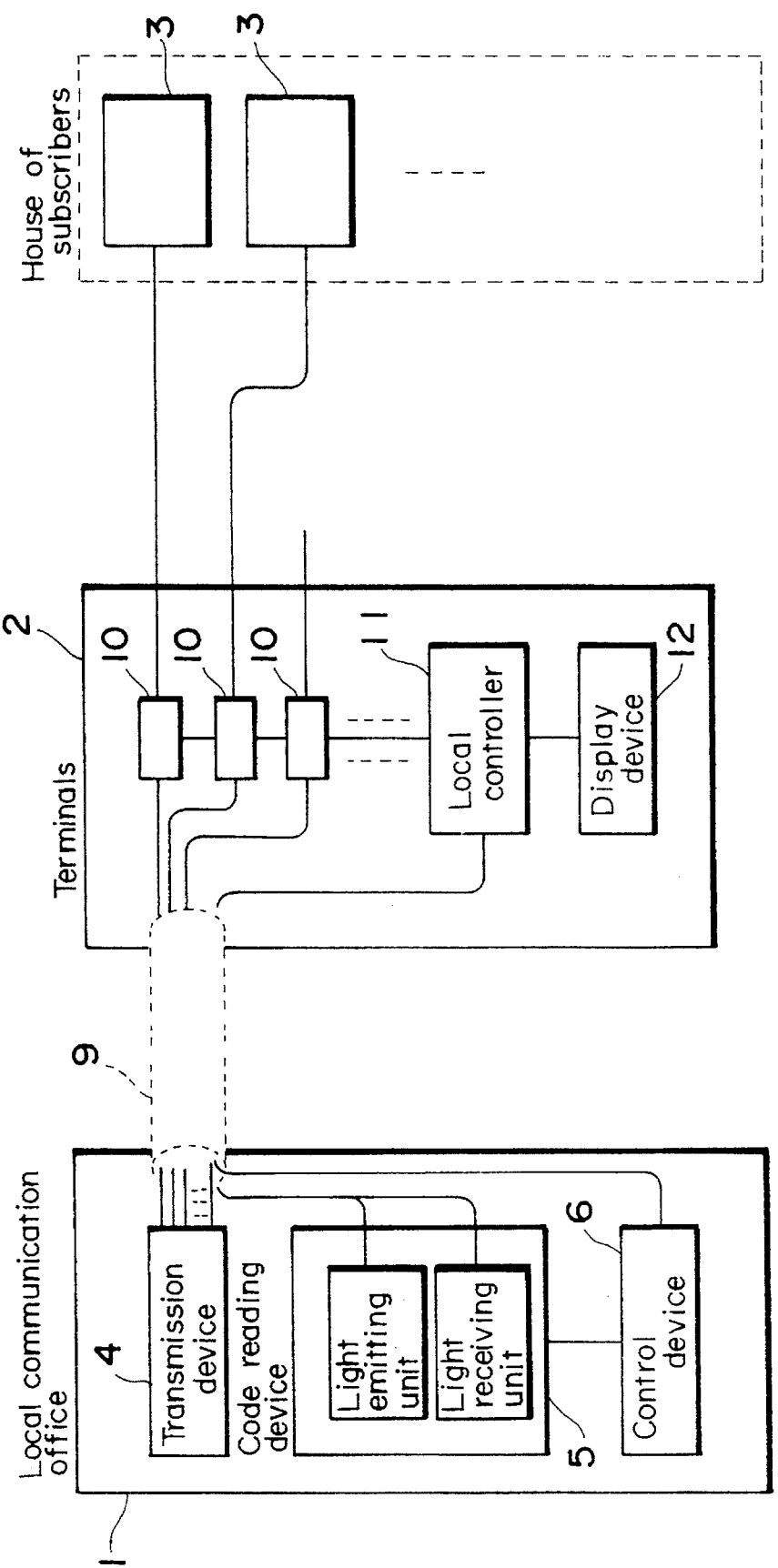
FIG. 1 is a block diagram of a control system of optical lines facility which is applied to a method for identifying an optical line of this invention.

FIG. 1 shows a structure of a control system of optical lines facility, which is applied to a method for identifying an optical line of this invention. A terminal 2 which switches the optical lines is placed between a local communication office 1 and a house of subscribers 3. A plurality of optical lines of which the one end is connected to a transmission device 4 inside of the office 1 are gathered as an optical fiber cable 9, and extend to the terminal 2. The other end of every optical line is connected to one end of a respective optical line extending to the house of subscribers 3 through an optical connector 10. As a result, the transmission device 4 inside of the office 1 and every house of subscribers 3 are substantially connected by one respective line.

In the optical connector 10, it can be freely operated by hand to switch connections. Before the switching is conducted, first, a route information of the optical lines is checked by an identifying method described thereinafter with a code reading device 5 placed inside of the office 1. Then, the route information is transmitted from a control device 6 to a local controller 11, and the information is given to an operator in the field through a display device 12. The operator conducts the requested connector switching based on the route information. After the switching is done, the route information is read again by the code reading device 5, and the route information is confirmed at the office 1 side. Then, this route information is displayed at the display device 12 through the control device 6 and the local controller 11, and the operator confirms the condition of the switching.

Figure 2:
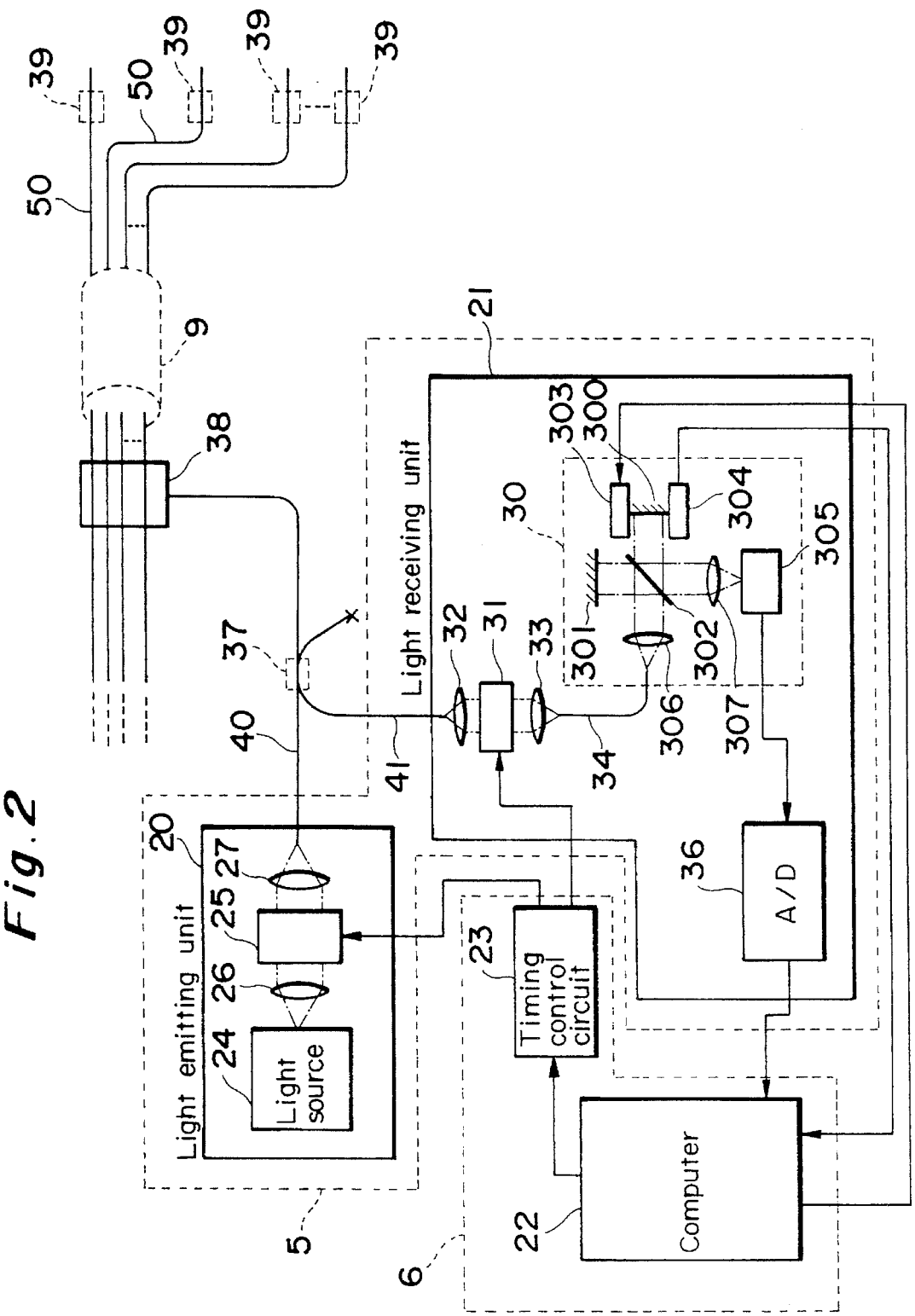
FIG. 2 is a block diagram of an inner structure of a code reading device and its peripheral devices according to an embodiment of the first invention.

FIG. 2 is a block diagram of an inner structure of the code reading device 5 and its peripheral devices. The code reading device 5 comprises a light emitting unit 20 and a light receiving unit 21, and they are controlled by a computer 22 and a timing control circuit 23 which form the control unit 6.

The light emitting unit 20 contains a light source 24 for emitting a light having an appropriate spectrum range such as white ray, an acoustooptic element 25 for controlling an on/off of an irradiation of light from the light source 24, and lenses 26, 27 placed respectively at an input and an output of the acoustooptic element 25. A light emitted from the light source 24 is inputted to one end of the optical fiber 40 as a detecting light through the lens 26, the acoustooptic element 25 and the lens 27. The optical fiber 40 is a branch optical line which connects the optical fibers 50 as optical lines to be measured and the code reading device 5. The optical fiber 40 is connected to the optical lines 50 with a connecting means 38. The connecting means 38 alternatively connects the optical fiber 40 to one of the optical lines 50.

The light receiving unit 21 contains a Michelson interferometer 30, an A/D convertor circuit 36 for converting an output signal from the Michelson interferometer 30 to a digital value and providing it to the computer 22, and an acoustooptic element 31 for controlling an on/off of an input light to the Michelson interferometer 30 based on a signal from the timing control circuit 23. The numerals 32, 33 denote lenses, and the numeral 34 denotes an optical fiber. The Michelson interferometer 30 contains a movable mirror 300, a fixed mirror 301, a beam splitter 302, a movable mirror moving device 303, a position-of-movable-mirror reading device 304, a light receiving element 305, and lenses 306, 307. A light inputted to the Michelson interferometer 30 from the optical fiber 34 is diverged by the beam splitter 302, and one is led to the fixed mirror 301 and the other one is led to the movable mirror 300. The lights reflected by the mirrors come back to the beam splitter 302, and interfere each other. The interference light is inputted to the light receiving element 305 through the lens 307 and is converted to an electrical signal. At this time, as the optical path length inside of the interferometer is varied by moving the movable mirror 300, an interference waveform called an interferogram is obtained. This is a principle of operation of the Michelson interferometer 30. Using this principle, relative positions of the plurality of reflecting parts which form an identification code 39 are detected.

Figure 3:
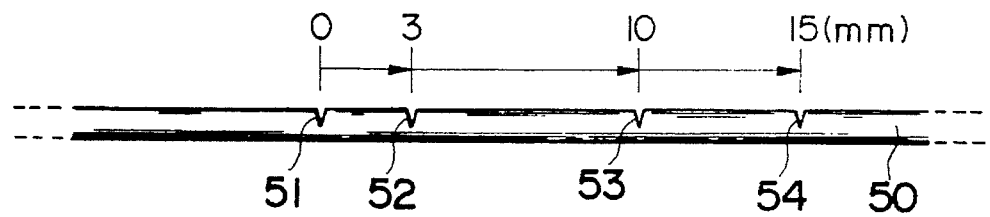
FIG. 3 shows an example of an identification code.

Every optical line 50 has unique identification codes 39 written in. The identification code 39 consists of the plurality of reflecting parts, and each optical line has a different combination of relative positions of the reflecting parts. The reflecting parts forming the identification code 39 are notches on the optical line 50, which are discontinuous points of refractive indices. FIG. 3 shows an example of the identification code 39. The identification code 39 contains 4 notches 51–54, and the notches 52, 53, 54 are respectively at a distance of 3 mm, 10 mm and 15 mm from the notch 51. Accordingly, if the detecting light from the light emitting unit 20 is inputted to the optical line 50, the reflected light arrived at the light receiving unit 21 from the identification code 39 includes optical path differences produced on the basis of distances between notch. The optical path differences are detected by the Michelson interferometer 30, so that the relative positions of the notches 51–54 can be detected.

The identification code 39 is applied to the optical lines between the local communication office 1 and the terminal 2, and to the optical lines between the terminal 2 and the houses of subscribers 3 as shown in FIG. 1. If there is a plurality of terminals between the office 1 and the houses 3, the identification code is also applied to the optical lines between the terminals.

Next, a method for reading an identification code 39 will be explained. For instance, if the detecting light is inputted to the optical line 50 applied the identification code including the four reflecting parts 51–54 as shown in FIG. 3, the light receiving unit 21 collaborates with the computer 22 to get an interferogram shown in FIG. 4A. This means that a main interference light intensity is obtained when the optical path difference is zero, and sub interference light intensities are obtained for all combination of two reflecting parts chosen from the reflecting parts 51–54. Concretely, the sub interference intensities appear at the optical path difference of 3 mm, 5 mm, 7 mm, 10 mm, 12 mm, and 15 mm.

FIG. 4B is a chart of an observational result corresponding to a code information. The 15 bits code information "001010100101001" is obtained from the observational result in FIG. 4A. The content of the code information is set freely as selecting a number of the reflecting parts or positions of the reflecting parts.

In this embodiment, the optical line which connects the office 1 and the house of subscribers 3 consists of two divided optical lines connected with the terminal 2. Since the identification code is applied to every divided optical line, they have to be distinguished and confirmed. For this reason, the acoustooptic element 31 is used. In other words, the pulsed detecting light is inputted to the optical line to be measured on the basis of the control of the timing control circuit 23, and based on the input timing of the detecting light, the reflected light from every identification code on the same optical line is periodically pick up by the acoustooptic element 31. Therefore, the reflected lights from the identification codes at different points on the same optical line is distinguished while the computer 22 distinguishes the reflected light from every identification code, it obtains a data of the light intensities of the reflected lights, and gets the interferogram of every identification code on the same optical line based on the input timing of the detecting light. Picking up the reflected light periodically can be achieved with an optical gate (optical deflector) instead of the acoustooptic element 31.

Figure 5:
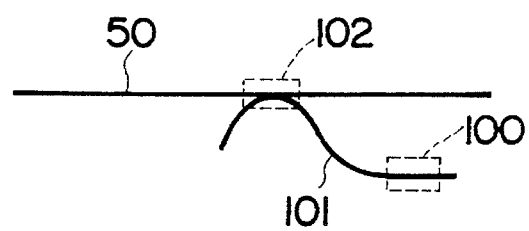
FIG. 5 shows a branch optical line on which an identification code is formed.

Further, instead of writing the identification code directly to the optical line, a branch optical line 101 in which the identification code is written can be connected thereto with a fiber coupler 102 as shown in FIG. 5.

Figure 6:
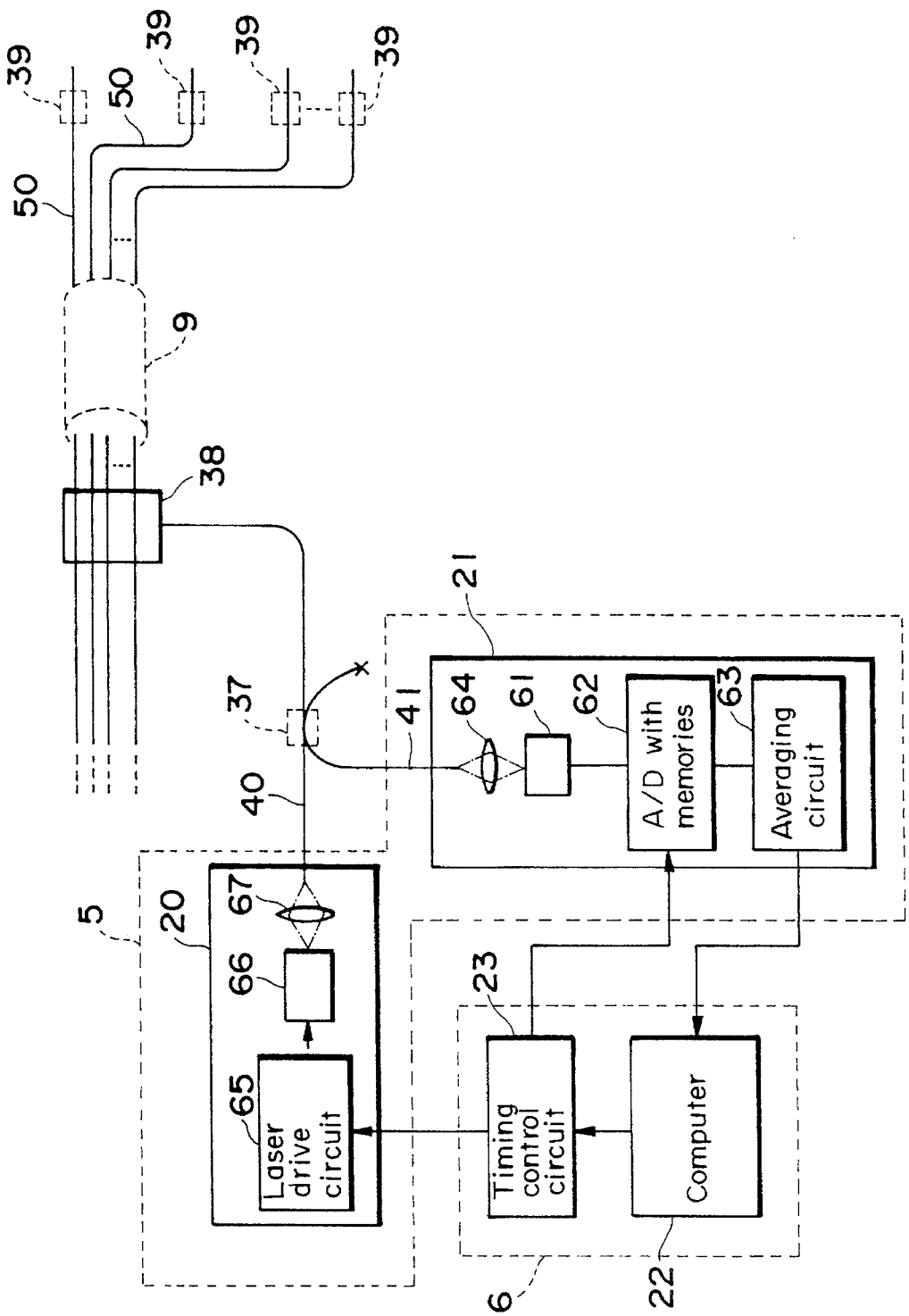
FIG. 6 is a block diagram of another structure of a code reading device.

FIG. 6 is a block diagram of a device for an identifying method according to another embodiment of the invention. The embodiment described above is to detect a relative positions of reflecting parts based on an interference of reflected lights. On the other hand, this embodiment is to detect a relative positions of reflecting parts by measuring an arrival time difference between reflected lights. A light emitting unit 20 contains a semiconductor laser 66 for outputting a pulse light having a short pulsewidth, and a laser drive circuit 65. A light receiving unit 21 contains a light receiving element 61, an A/D convertor circuit 62 with memories, and an averaging circuit 63. The numerals 64 and 67 denote lenses respectively.

Figure 7:
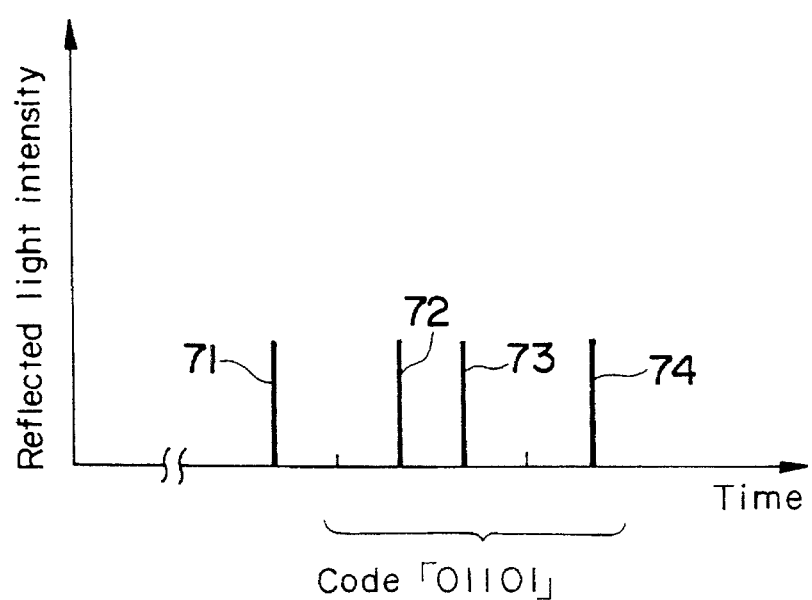
FIG. 7 is a graph of a detecting result.

In this embodiment, a pulsed detecting light is inputted to the optical line 50, and a time variation in the reflected light intensities is measured, so that the code information corresponding to the relative positions of the reflecting parts can be read. FIG. 7 shows a graph of an example of a measurement result according to this embodiment. The ordinate indicates a reflected light intensity and the abscissa indicates a time. This example is to measure the reflected lights from the identification code having four reflecting parts including the reference reflecting part (the nearest reflecting part to the detecting light emitting side). The reflected light 71 from the reference reflecting part is arrived first, and the reflected lights 72, 73 and 74 are arrived in order of a distance close to the reference reflecting part. Assuming the reflecting parts except the reference reflecting part can be set only at five points equally separated, the 5 bits identification code can be made by existence of the reflecting part at the each point. In FIG. 7, the code information "01101" is indicated.

Next, an embodiment according to a second invention will be explained. FIG. 8 is a block diagram of an inner structure of a code reading device 5 and its peripheral devices in case that this embodiment applies to a control system of optical lines facility shown in FIG. 1. A code reading device 5 contains a light emitting unit 1020 and a light receiving unit 1021, and they are controlled by a computer 1022 and a timing control circuit 1023 which form a control circuit 6.

The light emitting unit 1020 contains a light source 1024 for emitting a light having an adequate spectrum range such as white ray, an acoustooptic element 1025 for controlling an on/off of a light outputted from the light source 1024, and lenses 1026, 1027 placed respectively at an input and an output of the acoustooptic element 1025. The light emitted from the light source 1024 is inputted to one end of an optical fiber 40 as a detecting light through the lens 1026, the acoustooptic element 1025, and the lens 1027. The optical fiber 40 is a branch optical line which connects optical fibers 50 to be measured and the code reading device 5. The optical fiber 40 is connected to the optical lines 50 with a connecting means 38. The connecting means 38 alternatively connects the optical fiber 40 to one of a plurality of the optical lines 50.

The light receiving unit 1021 contains a Fabry-Perot etalon 1032 as an interference spectroscope, an etalon controller 1033 for controlling a space between two plane boards for a resonance in the etalon 1032, lenses 1030, 1031 placed respectively at an input and an output of the etalon 1032, a light receiving element 1034 for converting a light intensity of the output light from the etalon 1032 to an electrical signal, a boxcar integrator 1035 for periodically picking up an output signal from the light receiving element 1034 based on a signal from a timing control circuit 1023, and an A/D convertor circuit 1036 for converting an output of the boxcar integrator 1035 to a digital signal. The etalon 1032 inputs a light from an optical fiber 41 connected to an optical fiber 40 with a fiber coupler 37 and analyzes spectra. At this time, the etalon controller 1033 controls a space between resonance planes in the etalon 1032 based on an instruction from a computer 1022. As the computer 1022 obtains a data from the A/D convertor circuit 1036 with controlling the etalon 1032, it analyzes a wavelength of the reflected light.

Figure 9A:
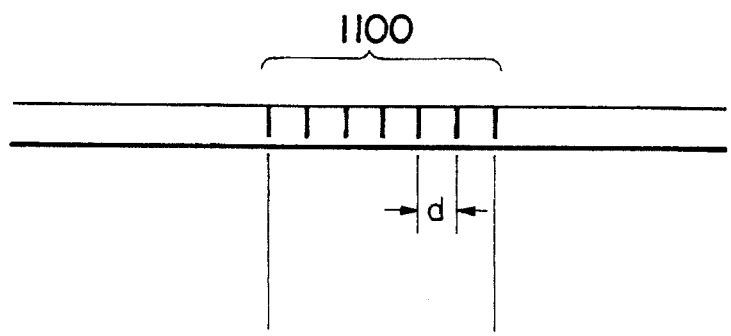
FIG. 9A shows an example of an identification code according to the embodiments of the second, third, and fifth invention.
Figure 9B:
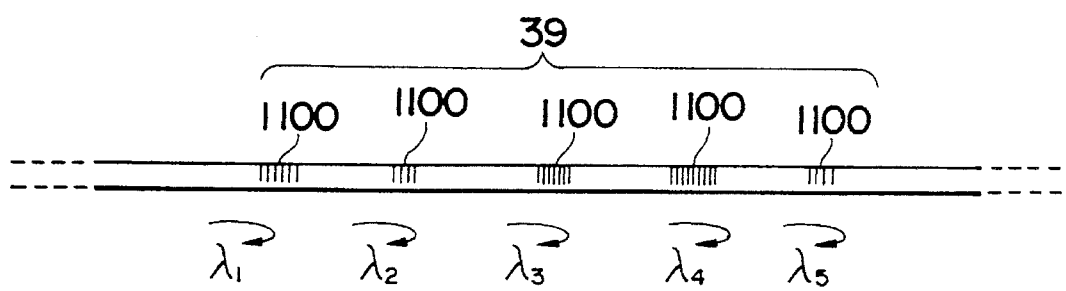
FIG. 9B shows an example of an identification code according to the embodiments of the second, third, and fifth invention.

Each optical line 50 has unique identification codes 39 written in. The identification code consists of a plurality of reflecting parts. The each reflecting part reflect a light having a specific wavelength only. The optical line has a different combination of specific wavelengths of the reflecting parts each other. Every reflecting part forming the identification code 39 is a striped pattern formed by varying the refractive index of the optical line 50 locally. As a spatial frequency of a variation of the refractive indices is adequately set, every reflecting part can obtain a unique wavelength of the reflected light. As shown in FIG. 9A, the reflecting part is the striped pattern where the refractive index is varied over a specific cycle. Let the cycle of the striped pattern 1100 (a distance between the refractive index varying points which adjoin each other) is d and a mean refractive index of the optical line at the reflecting part is n, the wavelength $\gamma$ of the reflected light is represented as $\gamma=2$nd. Accordingly, as d and n are adequately set, the desired wavelength of the reflected light can be obtained. The reflecting parts 1100 obtained in such a way are set at plural points (in FIG. 9B, five points) on the optical line 50 as shown in FIG. 9B, and as the wavelengths $\gamma_1-\gamma_5$ of the reflected lights are set adequately, the identification code can be formed. The refractive index can be varied permanently as a UV ray (Ultra Violet Ray) is partly irradiated to the optical line 50. By using this, the reflecting part which reflects a specific wavelength only can be formed.

The identification code 39 is applied to the optical lines between the office 1 and the terminal 2, and to the optical lines between the terminal 2 and the houses of subscribers 3 as shown in FIG. 1. If there is a plurality of terminals between the office 1 and the houses of subscribers 3, the identification code is also applied to the optical lines between the terminals.

Next, a method for reading an identification code 39 in this embodiment will be explained. For instance, by using five wavelengths γ1–γ5, a binary number is coded. This means that existence of a reflected light in the five wavelengths are corresponded to "1" or "0". FIG. 10A is a graph of an example of wavelength characteristics of the reflected lights when the detecting light from the light emitting unit 1020 is given to the optical line 50. The graph shows a wavelength on the abscissa and a light intensity on the ordinate. In this example, the reflected lights at wavelengths of γ1, γ3 and γ5 can be observed, and on the other hand, the reflected lights at wavelength of γ2 and γ4 cannot be observed. FIG. 10B is a chart of an observational result corresponded to the code information. A five bits code information "10101" is obtained from the result in FIG. 10A.

In this embodiment, the optical line which connects the office 1 and the house of subscribers 3 consists of two divided optical lines connected with the terminal 2. Since the identification code is applied to every divided optical line, they have to be distinguished and confirmed. For this reason, the boxcar integrator 1035 is used. In other words, the pulsed detecting light is inputted to the optical line to be measured while the input timing is controlled by the timing control circuit 1023, and the reflected light from each identification code is periodically picked up based on the input timing of the detecting light. Therefore, the reflected lights from identification codes whose locations are different from each other on the same optical line can be distinguished. As the computer 1022 distinguishes the reflected light from each identification code, it obtains a data of the reflected light intensities in correspondence with the wavelength, so that the computer gets the interferogram of each identification code. The distinction of reflected light can be achieved with an optical gate (optical deflector) instead of the boxcar integrator 1035.

Instead of writing the identification code directly in the optical line, a branch optical line 1101 in which the identification code 1100 is written can be connected thereto with a fiber coupler 1102 as shown in FIG. 11.

Figure 12:
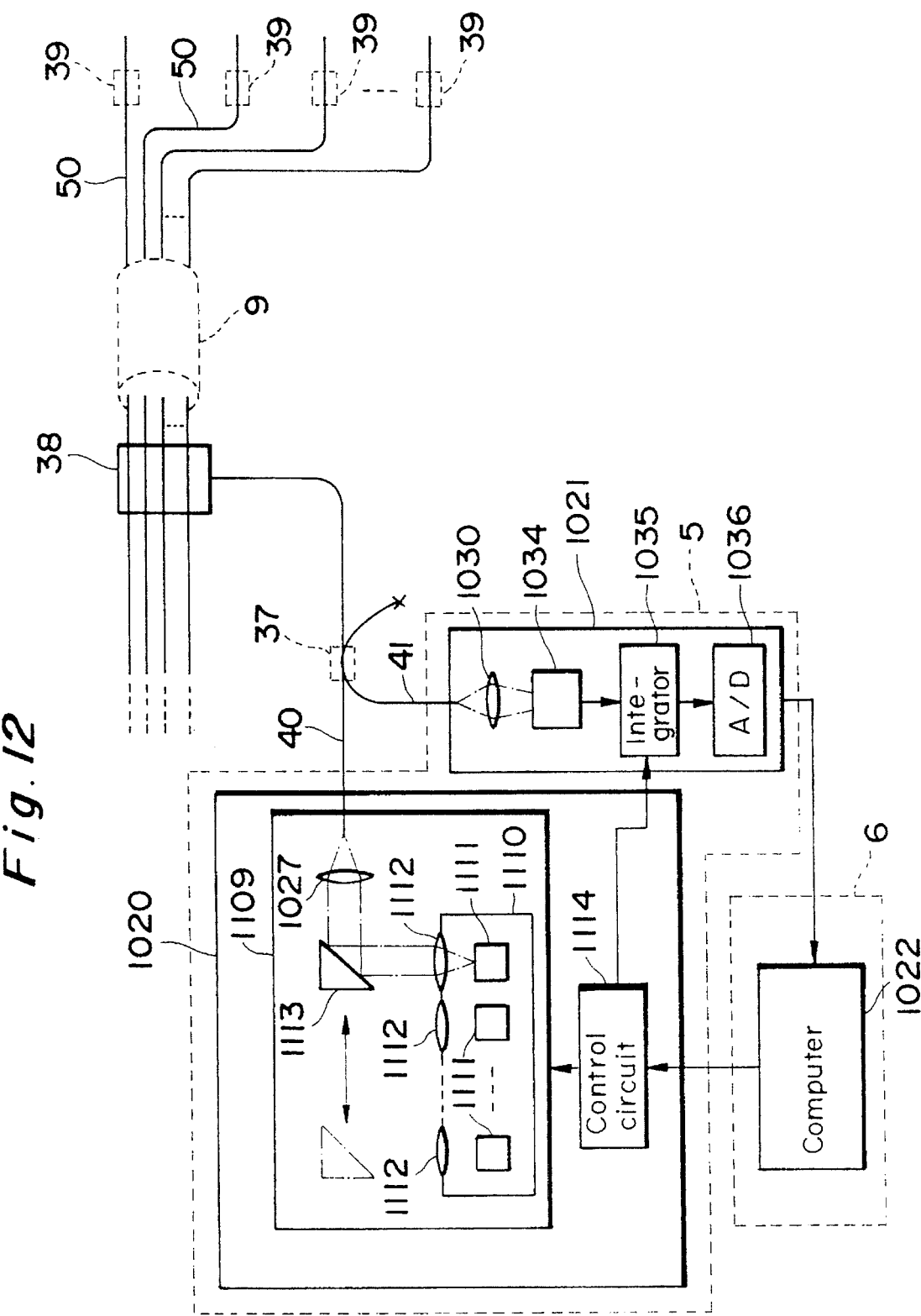
FIG. 12 is a block diagram of a structure of another code reading device according to the embodiments of the second, third and fourth invention.

In the embodiment described above, the white-light source 1024 is used as the light source, and the Fabry-Perot etalon 1032 is used as the spectroscope in the light receiving unit 1021. Instead of them, when a light source 1109 which is a wavelength switching type is used in the light receiving unit 1021 as shown in FIG. 12, the spectroscope in the receiving unit 1021 can be omitted. The light source 1109 incorporates a semiconductor laser array 1110, a prism 1113, and a condenser lens 1027. The semiconductor laser array 1110 includes a plurality of the semiconductor lasers 1111 for emitting light of different wavelengths, and a lens 1112 which is placed at every semiconductor laser 1111. A control circuit 1114 controls a drive of the semiconductor laser 1111 and a movement of the prism 1113. Then, the light source 1109 can selectively outputs a detecting light having a required wavelength. The wavelength of the reflected light at every reflecting part is selected among the wavelengths emitted from the semiconductor lasers 1111. Accordingly, if the wavelength of the detecting light is subsequently switched and the existence of the reflected light at every wavelength is detected when the identification is conduced, similarly to the embodiment described above, the wavelength of the reflected light for every reflecting part can be obtained. In this embodiment, in order to periodically pick up the reflected light, the boxcar integrator 1035 is operated based on the timing signal from the control circuit 1114. But it is also possible that a light receiving element is placed at unused end of the optical fiber 41 to detect an input timing of the detecting light, and this detecting light is used as an operational timing signal for the boxcar integrator 1035.

Figure 13:
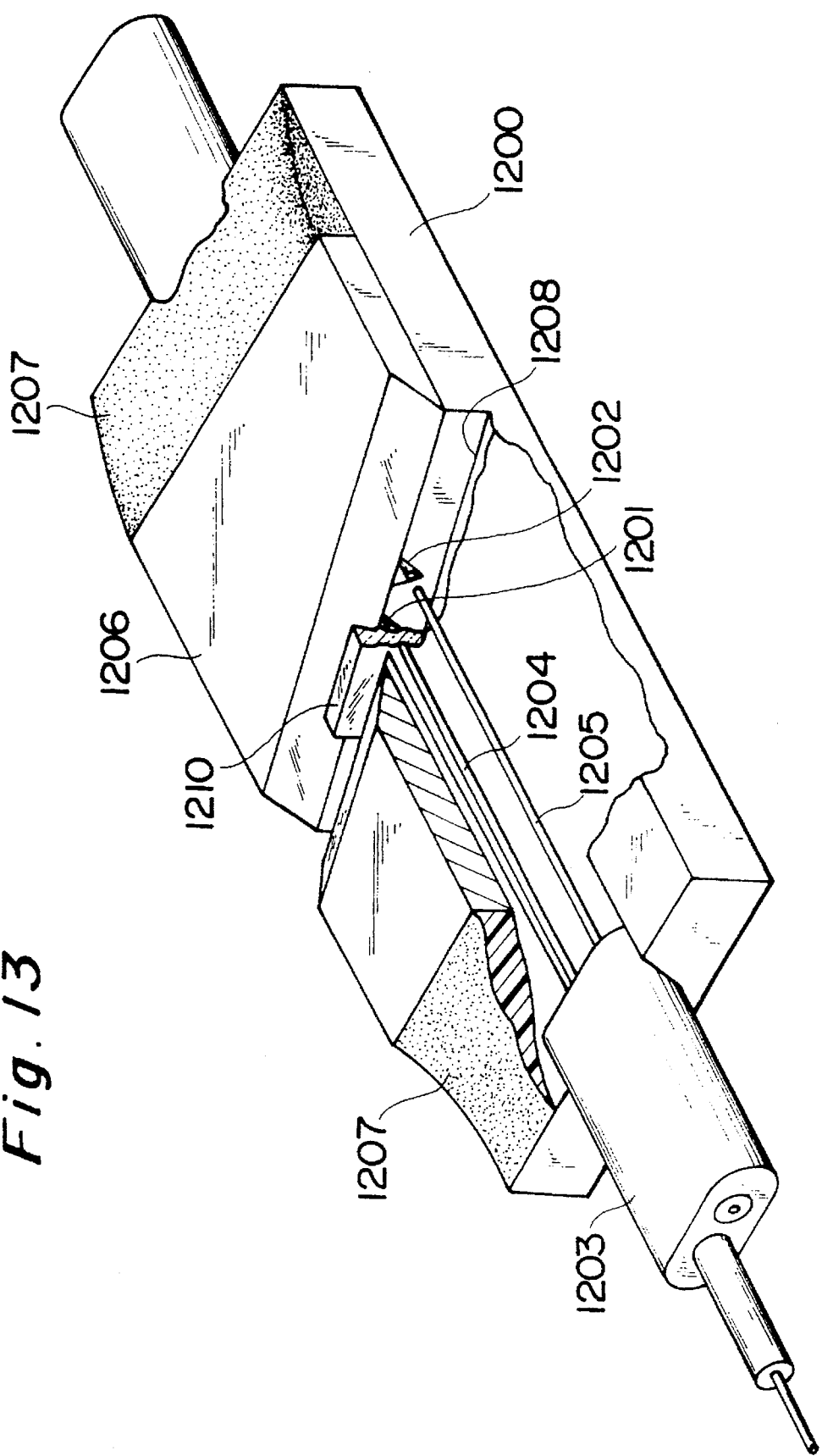
FIG. 13 is a perspective view of a structure of another reflecting part according to the embodiments of the second, third, fourth, and fifth invention.

FIG. 13 is a perspective view of a structure of another example of a reflecting part used as an identification code 39. In this example, an optical filter is used as a reflecting part which reflects a specific wavelength only. A method for forming the identification code will be briefly explained. Two V-shaped notches 1201, 1202 are formed on a silicon board 1200, and core fibers 1204 and 1205 of a double core tape fiber 1203 which are optical lines are buried in respectively. Then, a silicon lid is put over and is hardened with a resin 1207 to fix the optical fibers 1204 and 1205. Next, as a notch 1208 is formed on the silicon board 1200 over the silicon lid 1206, the optical fibers 1204 and 1205 are cut. Then, a desired monochromatic reflecting optical filter 1210 is inserted in the notch 1208, so that the reflecting part which reflects a specific wavelength only is formed on the optical line. The optical filter 1210 is formed by a dielectric multiple layered film etc. Using the method with this optical filter, in case that the optical line is either a double core tape fiber like in this example or multicore tape fiber, it is possible to apply the same identification code to every optical fiber at the same time.

Figure 14:
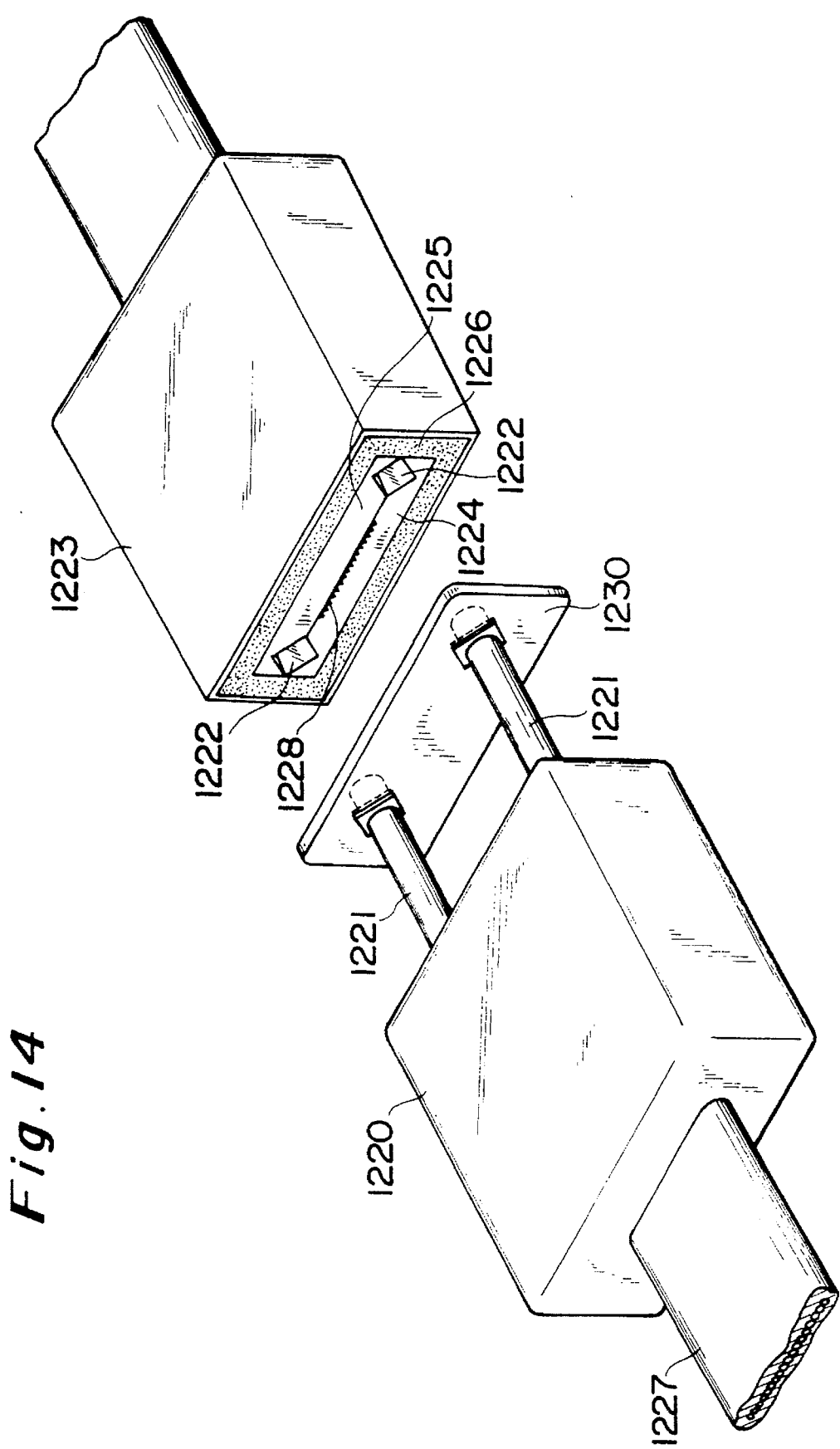
FIG. 14 is a perspective view of a structure of another reflecting part according to the embodiments of the second, third, fourth, and fifth invention.

FIG. 14 is a perspective view of an example of an optical filter placed in a connector. Usually, an optical line is formed as a plurality of divided optical fibers is connected by connectors. In this example, as the optical filter which comprises an identification code is placed on one side of a connector, an installation of the optical filter becomes easy. The connector includes a male connector 1220 having a guide pin 1221, and a female connector 1223 having receiving holes for the guide pin 1221. Each connector 1220, 1223 has a structure that two silicon chips 1224, 1225 are piled and hardened with an epoxy resin 1226. A number of V-shaped notches equal to or larger than the number of optical fibers forming a tape fiber 1227 are placed on the silicon chip 1224, and each optical fiber is fixed in the V-shaped notch. As the guide pins 1221 are inserted to the receiving holes 1222, the optical fibers on the side of the male connector 1220 and the optical fibers on the side of the female connector 1223 are coupled one by one. Before the coupling, a monochromatic reflecting optical filter 1230 is inserted between them, so that the identification code can be formed on the optical line. In this example, the optical filter is made separately from the connectors 1220, 1223. But it is possible to form a dielectric multiple layered film on one side of the female connector 1223 by vapor-deposition.

Next, an embodiment corresponding to a third invention will be explained. This embodiment is similar to the second invention already explained with FIG. 8–FIG. 14. A point of difference is to use not only a wavelength of a reflected light but also a reflected light intensity as an identification code. This embodiment is also applied to a control system of optical lines facility as shown in FIG. 1. An inner structure of a code reading device and its peripheral devices are shown in FIG. 8.

An identification code 39 consists of a plurality of reflecting parts. The each reflecting part reflect a light having a specific wavelength only. Each optical line has a different combination of specific wavelengths and reflectance. Using the reflectance also as an identification code is different from the second invention. Every reflecting part forming the identification code 39 contains striped pattern where refractive indices are varied locally on the optical line 50. As a spatial frequency of a variation of the refractive indices or a value of the refractive index is adequately set, every reflecting part can obtain a unique wavelength of the reflected light and the reflectance. As shown in FIG. 9A, the reflecting part contains striped pattern where the refractive indices are varied over a specific cycle. Let a cycle of the striped pattern 1100 (i.e. a distance between the refractive index varying points which adjoin each other) is d and a mean refractive index of the optical line at the reflecting part is n, the wavelength $\gamma$ of the reflected light is represented as $\gamma=2nd$. Accordingly, as d and n are adequately set, the desired wavelength of the reflected light can be obtained. The desired reflectance can be obtained by conducting the number of stripes and the difference of the refractive indices at striped pattern. The reflecting part 1100 obtained in such a way is set at plural parts (In FIG. 9B, five parts) on the optical line 50 as shown in FIG. 9B, and as the wavelengths $\gamma_1$–$\gamma_5$ and the reflectances of the reflected lights are adequately set, the identification code can be formed. The refractive index can be varied as a UV ray (Ultra Violet Ray) is partly irradiated to the optical line. By using this, the reflecting part which reflects a light with a specific wavelength and reflectance only can be formed.

The identification code 39 is applied to the optical lines between the office 1 and the terminal 2, and to the optical lines between the terminal 2 and the houses of subscribers 3 as shown in FIG. 1. If there is a plurality of terminals between the office 1 and the houses of subscribers 3, the identification code is also applied to the optical lines between the terminals.

Figures 15A, 15B:
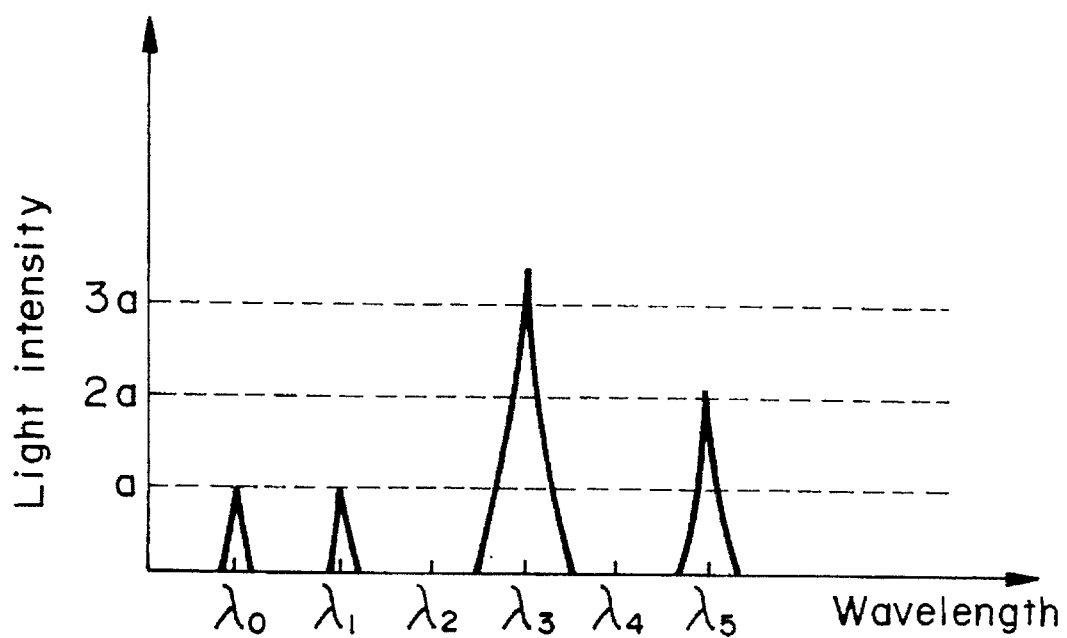
FIG. 15A is a graphic representation which shows a method for converting a reflected light spectrum to a quaternary code information according to the embodiment of the third invention.
FIG. 15B is a table which shows a method for converting a reflected light spectrum to a quaternary code information according to the embodiment of the third invention.

Next, a method for reading an identification code in this embodiment will be explained. For instance, using six wavelengths $\gamma_0$–$\gamma_5$, a 4 notation number is coded. This means that if $\gamma_0$ is a reflected wavelength at a reference reflecting part, and based on the reflected light intensity at the reference reflecting part, the other reflected lights with wavelengths $\gamma_1$–$\gamma_5$ are corresponded to one of "0"–"3". FIG. 15A is a graph of an example of wavelength characteristics of the reflected lights when the detecting light from a light emitting unit 20 is given to the optical line 50. The graph shows a wavelength on the abscissa and a light intensity on the ordinate. In this example, the reflected lights at wavelengths $\gamma_1$–$\gamma_5$ are respectively corresponding to the reflected light intensities "a,0,3a,0,2a". FIG. 15B is a chart of an observational result corresponded to a code information. The code information "10302" is obtained from the result in FIG. 15B.

In this embodiment, similar to the embodiment according to the second invention, the identification code on every divided optical line can be distinguished by the boxcar integrator 1035.

The identification code can be written in a branch optical line as shown in FIG. 11.

Further, it is possible to apply the embodiments already described with FIG. 12–FIG. 14.

Next, an embodiment according to a fourth invention is also applied to a control system of optical lines facility as shown in FIG. 1. An inner structure of a code reading device and its peripheral devices are shown in FIG. 8. In this embodiment, an identification code 39 includes a reflecting part where the reflectance depend on wavelengths. The reflecting part contains striped pattern where the refractive indices are locally varied. As a spatial frequency of a variation of the refractive indices or a value of a refractive index is adequately set, the reflected light spectrum can be obtained. The reflected light spectrum is a content of the identification code 39. The identification code 39 is applied to the optical line between the office 1 and the terminal 2, and to the optical line between the terminal 2 and the houses of subscribers 3 as shown in FIG. 1. If there is a plurality of terminals between the office 1 and the houses of subscribers 3, the identification code is also applied to the optical lines between terminals.

FIG. 16A–FIG. 16C show a method for writing reflecting parts which form an identification code 39. Every figure shows that as a UV ray (Ultra Violet Ray) is locally irradiated to the optical line 50 to vary a refractive index of the irradiated part, the reflecting part having a desired reflected light spectrum is formed. FIG. 16A shows a method for recording with a hologram. The UV ray 2062 is irradiated to the hologram 2061, and the diffracted lights by a hologram pattern recorded on the hologram 2061 are projected to the optical line 50. The refractive index is locally varied corresponding to a pattern formed by the diffracted lights, so that the reflecting part 2064 containing stripes of varied refractive index is formed on the optical line 50. The pattern made by the diffracted lights is freely set by changing a hologram pattern. FIG. 16B shows a method for forming a reflecting part 2074 having the striped pattern with the refractive index varied by condensing the UV ray 2072 with a lens 2073, and projecting a mask pattern 2071 having specific intervals and transmissivity of stripes to the optical line 50. FIG. 16C shows another method for forming a reflecting part having the striped pattern with the refractive index varied. This method comprises a control process of a UV ray intensity by forming a slit image with the UV ray 2083 on an optical line 50 using a slit 2081 and a lens 2082 and a control process of a movement of the slit image. While the UV ray intensity is adequately varied, the slit image is moved along the optical line 50 with a control of its speed to form the reflecting part. These method for writing the identification code can be applied to the embodiments according to the second and third invention described above and to an embodiment according to a fifth invention described thereinafter.

Figures 17A, 17B:
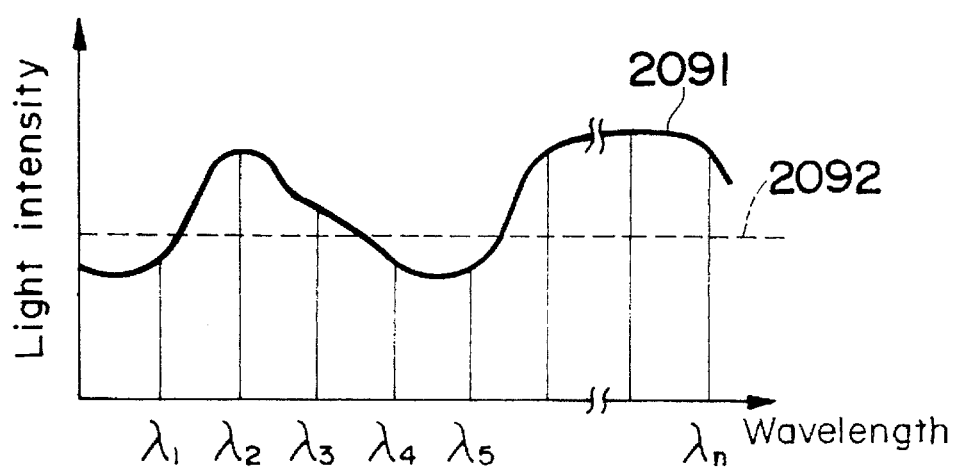
FIG. 17A is a graphic representation which shows a method for converting a reflected light spectrum to a binary code information according to the embodiment of the fourth invention.
FIG. 17B is a table which shows a method for converting a reflected light spectrum to a binary code information according to the embodiment Of the fourth invention.

Next, a method for reading an identification code 39 of this embodiment will be explained. FIG. 17A is a graph of an example of a reflected light spectrum at an identification code 39 when the detecting light from a light emitted unit 1020 is given to the optical line 50. In this graph, the abscissa indicates a wavelength and the ordinate indicates a light intensity. A threshold level 2092 is adequately set to the reflected light spectra 2091, and a binary code is applied to each wavelength based on whether the light intensity at each of wavelengths $\gamma_1$–$\gamma_n$ is larger or smaller than the threshold level 2092. FIG. 17B shows a corresponding chart between the wavelengths and binary cords. In the chart, when the light intensity is larger than the threshold level 2092, "1" is given, and when the light intensity is smaller than the threshold level 2092, "0" is given. In such a way, the reflected light spectra can be easily coded to a binary digit. It is possible that the method for setting a threshold level 2092 is to set a light intensity at a specific wavelength of a reflected light as a threshold level 2092 other than the method for setting a threshold level in advance.

In this embodiment, similar to the embodiment according to the second invention, the identification code on every divided optical line can be periodically picked up by the boxcar integrator 1035.

The identification code can be written to a branch optical line as shown in FIG. 11.

Figure 18:
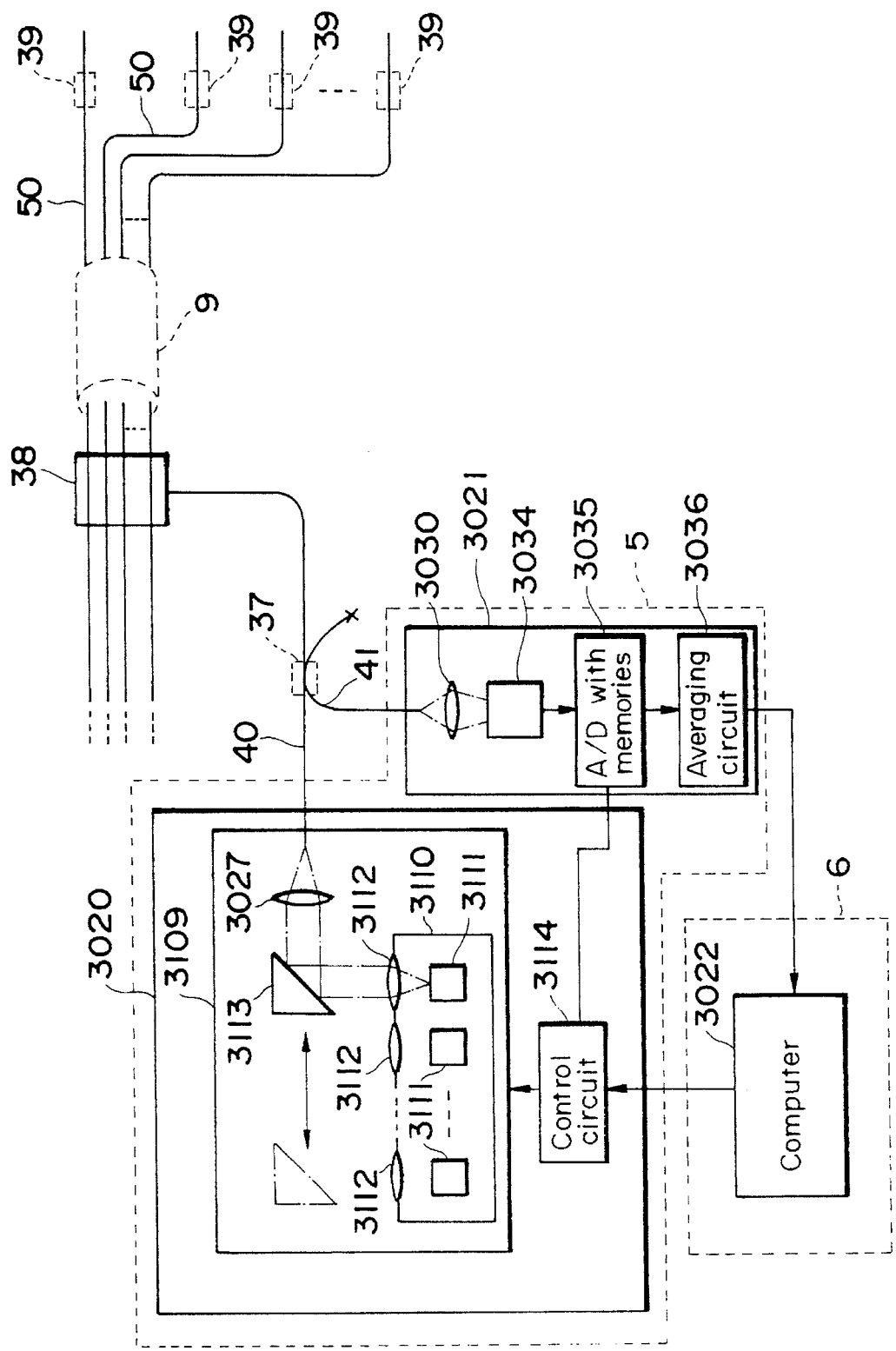
FIG. 18 shows a block diagram of a code reading device and its peripheral devices according to the embodiment of the fifth invention.

Further, it is possible to apply the embodiments already described with FIG. 12–FIG. 14. Next, an embodiment according to a fifth invention will be explained. FIG. 18 is a block diagram of an inner structure of a code reading device 5 and its peripheral devices in case that this embodiment applies to a control system of optical lines facility shown in FIG. 1.

The light emitting unit 3020 contains a light source 3109 and its drive control circuit 3114. The light source 3109 incorporates a semiconductor laser array 3110, a prism 3113, and a condenser lens 3027. The semiconductor laser array 3110 contains a plurality of semiconductor lasers 3111 which emit lights of different wavelengths, and a lens 3112 which is placed at every semiconductor laser 3111. The drive control circuit 3114 selectively controls a drive of the semiconductor laser 3111 and a movement of the prism 3113, so that the light source 3109 can selectively output a detecting light having a required wavelength. An optical fiber 40 is a branch optical line which connects optical fibers 50 to be measured and a code reading device 5, and is connected to the optical fibers 50 to be measured with a connecting means 38. The connecting means 38 selectively connects the optical fiber 40 to one of the optical lines 50 to be measured.

A light receiving unit 3021 contains a light receiving element 3034 for converting an inputted light to an electrical signal, and an A/D convertor circuit 3035 with memories for converting a signal from the light receiving element 3034 to a digital value, and an averaging circuit 3036 for averaging the digital value from the A/D convertor circuit 3035. An optical fiber 41 is connected to the optical fiber 40 with an optical fiber coupler 37, and one end is led to the light receiving unit 3021. The A/D convertor circuit 3035 stores a time variation in signals from the light receiving element 3034 based on the emitting timing of the detecting light from the drive control circuit 3114 and converts an analog data to a digital data in an appropriate interval. Accordingly, a period from time when the light emitting unit 3020 emits the detecting light to time when the reflected light comes back can be detected.

Since the reading unit 5 is constructed in this way, a computer 3022 can identify a specific wavelength of every reflecting part which forms an identification code 39 and a relative position thereof, using a combination of the wavelength of a detecting light and the time when the reflected light at the identification code 39 arrives.

Each optical line 50 has unique identification codes 39 written in. The identification code 39 consists of a plurality of reflecting parts. Each reflecting part reflects a light having a specific wavelength only. Each optical line has a different combination of specific wavelengths and relative positions of reflecting parts. Every reflecting part forming the identification code 39 contains striped pattern where refractive indices are varied locally on the optical line 50. As a spatial frequency of a variation of the refractive indices etc. are adequately set, every reflecting part can obtain a unique wavelength of the reflected light. As shown in FIG. 9A, the reflecting part contains striped pattern where the refractive indices are varied over a specific cycle. Let a cycle of the striped pattern 1100 (i.e. a distance between refractive index varying points which adjoin each other) is d and a mean refractive index of the optical line at the reflecting part is n, the wavelength $\gamma$ of the reflected light is represented as $\gamma=2nd$. Accordingly, d and n are adequately set, so that the desired wavelength of the reflected light can be obtained. The reflecting part 1100 obtained in such a way is set at plural parts (In FIG. 9B, 5 parts) on the optical line 50 as shown in FIG. 9B, and as the wavelengths $\gamma_1$–$\gamma_5$ of the reflected lights and relative positions of the reflecting parts are set adequately, the identification code can be formed. The refractive index cam be varied as a UV ray (Ultra Violet Ray) is locally irradiated to the optical line 50. By using this, the reflecting part which reflects a specific wavelength only is formed.

The identification code 39 is applied to the optical lines between the office 1 and the terminal 2, and to the optical lines between the terminal 2 and the houses of subscribers 3 as shown in FIG. 1. If there is a plurality of terminals between the office 1 and the houses of subscribers 3, the identification code is also applied to the optical lines between the terminals.

Next, a method for reading an identification code 39 of this embodiment will be explained. For instance, n notation number is coded with n kinds of wavelengths $\gamma_1$–$\gamma_n$ as wavelengths of reflected lights. This means that numbers 1 to n are assigned to every wavelength. Then, a reflecting part having a wavelength characteristic selected from these wavelengths is applied to m points of the optical line 50. Accordingly, the n notation number of m figure can be coded with the specific wavelengths of the reflecting parts and their relative positions. Since the code reading device 5 can detect the wavelength of the detecting light and the arrival time of the reflected light, the code can be read. FIG. 19 shows a combination chart of wavelengths and the relative positions of the reflecting parts. This chart indicates that the wavelength $\gamma_2$ is formed first, $\gamma_1$ is a second, $\gamma_3$ is a third and so on, and as reading this and converting it to a code, "213 . . . ." is made.

In the embodiment above, the A/D convertor circuit 3035 is driven based on the timing signal from the drive control circuit 3114, but it is possible that with the light receiving element placed at unused end of the optical fiber 41, the input timing of the detecting light is detected, and this detected signal is used as an operational timing signal for the A/D convertor circuit 3035.

The identification code can be written in a branch optical line as shown in FIG. 11.

Further, it is possible to apply the embodiments already explained with FIG. 13–FIG. 14.

Next, an embodiment according to a sixth invention will be explained. In this embodiment, a code reading device shown in FIG. 6 is applied to the system shown in FIG. 1.

Figure 20:
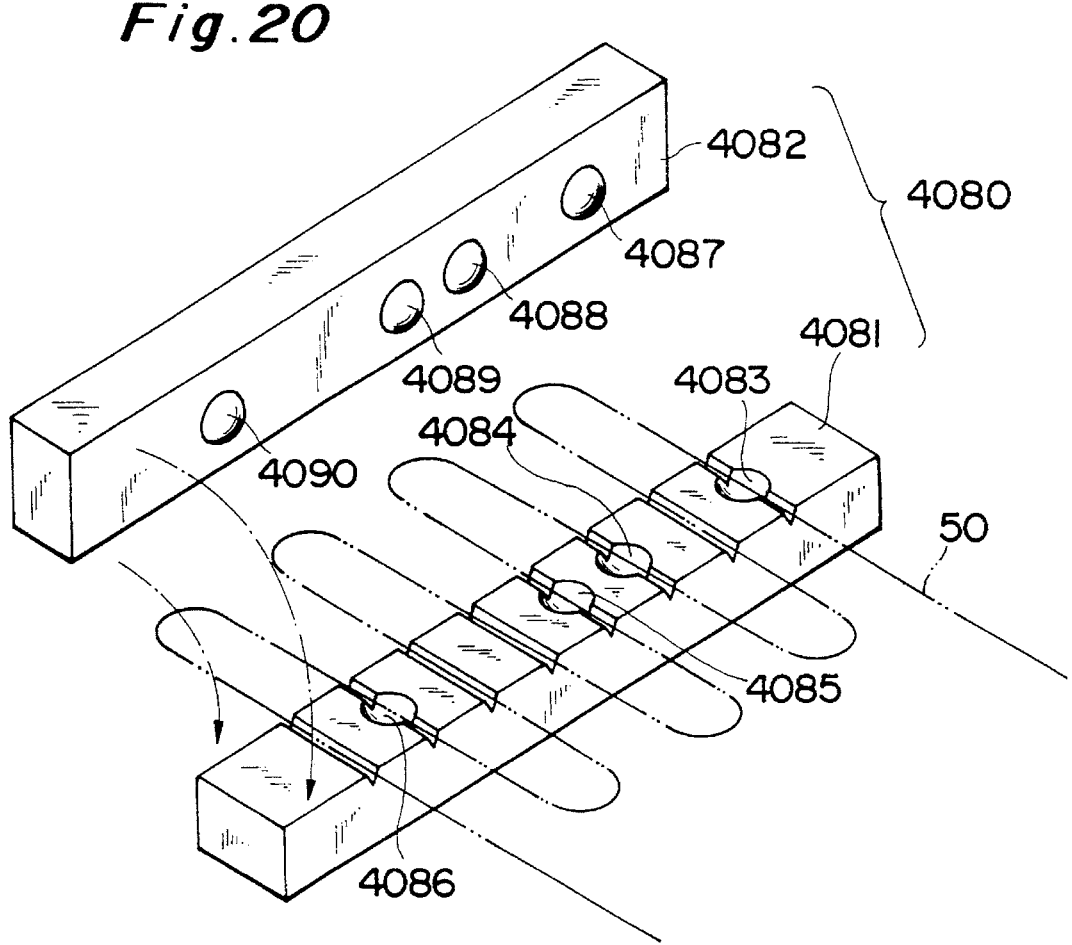
FIG. 20 is a perspective view of an example of a code information according to an embodiment of the sixth invention.

Each optical line 50 has unique identification codes 39 written in. The identification code 39 consists of a plurality of bending loss parts. A combination of relative positions of the bending loss parts is changed for each optical line. Every bending loss part forming the identification code 39 is a bending part on the optical line 50, and a concrete example of a jig is shown in FIG. 20. The jig 4080 consists a receiving member 4081 with V-shaped notches and a weight member 4082. In the receiving member 4081, concavities are formed at the V-shaped notches corresponding to a required identification code. Here, the concavities 4083–4086 are formed in the first, third, fourth, and seventh notch. On the weight member, projections 4087–4090 are formed at the position corresponding to the concavities on the receiving member 4081. The optical line 50 is meandered and inserted in the V-shaped notches on the receiving member 4081 and weighted over with the weight member 4082, so that the bending loss parts are formed at the first, third, fourth, and seventh V-shaped notch. At the code reading device 5, a pulsed detecting light is inputted to the optical line 50, and a time variation in backscattering light intensities is measured, so that a code information corresponding to a relative position of each bending loss part is read.

The identification code 39 is applied to the optical lines between the office 1 and the terminal 2, and to the optical lines between the terminal 2 and the houses of subscribers 3 as shown in FIG. 1. If there is a plurality of terminals between the office 1 and the houses of subscribers 3, the identification code is also applied to the optical lines between the terminals.

Next, a method for reading an identification code 39 in this embodiment will be explained. When a detecting light is inputted to the optical line 50 having the identification code formed with the four bending loss parts as shown in FIG. 20. The light receiving unit 21 collaborates with the computer 22 to obtain a characteristic of a time variation in the backscattering light intensities as shown in FIG. 21A. This means that at the each bending loss part, the backscattering light intensity rapidly decreases based on the irradiation loss. FIG. 21B shows a result of the differentiated characteristics. In this graph, peaks 4095, 4096, 4097 and 4098 are corresponding to the first, third, fourth and seventh bending loss part formed in the V-shaped notches. Assuming that the first bending loss part is a reference bending loss part and an existence of the bending loss part in 7 V-shaped notches except the notch for the first bending loss part is coded, the characteristics shown in FIG. 21B can be replaced with a seven bits code shown in FIG. 21C. The content of the code information is set freely as selecting a number of the bending loss parts or positions of the bending loss parts.

In this embodiment, the optical line which connects the office 1 and the houses 3 of subscribers consists of two divided optical lines connected with the terminal 2. Since the identification code is applied to every divided optical line, they have to be distinguished and confirmed. In order to do that, as an operation of the A/D convertor circuit 62 with memories is periodically controlled by timing control circuit 23, a variation of the light intensities is periodically picked up based on the input timing of the detecting light. Therefore, the variation of the light intensities at different points of the identification code on the same optical line can be distinguished. Picking up the backscattering light can be achieved with an optical gate (optical deflector). As shown in FIG. 11, the identification code can be written in a branch optical line.

Figure 22:
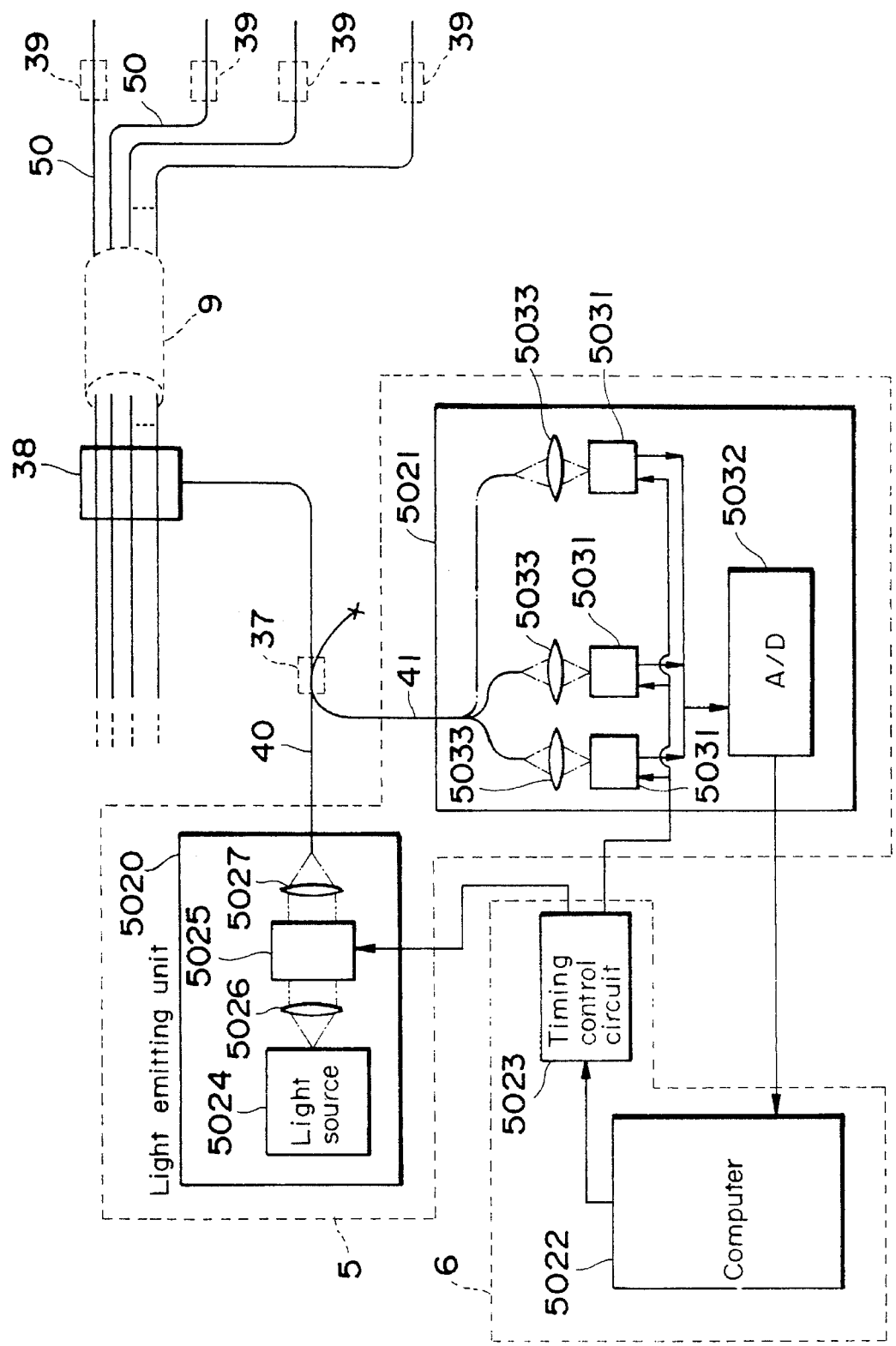
FIG. 22 is a block diagram of a code reading device and its peripheral devices according to the embodiment of the seventh invention.

Next, an embodiment according to a seventh invention will be explained. In this embodiment, a code reading device shown in FIG. 22 is applied to the system shown in FIG. 1. In this embodiment, optical lines between the office 1 and terminal 2 are gathered to be a multicore optical line, and further the multicore optical lines are gathered to be an optical fiber 9. The identification of the optical line described thereinafter is related to an identification of a multicore optical line. In this case, each mono-optical line inside of the multicore optical line is called a core optical fiber.

FIG. 22 shows a block diagram of an inner structure of a code reading device 5 and its peripheral devices. A code reading device 5 consists of a light emitting unit 5020 and a light receiving unit 5021, and they are controlled by a computer 5022 and a timing control circuit 5023 which form a control circuit 6.

The light emitting unit 5020 contains a light source 5024 for emitting a light having an adequate spectrum range such as white ray, an acoustooptic element 5025 for controlling an on/off of a light outputted from the light source 5024, and lenses 5026, 5027 placed respectively at an input and an output of the acoustooptic element 5025. The light emitted from the light source 5024 is inputted to one end of an optical fiber 40 as a detecting light through the lens 5026, the acoustooptic element 5025, and the lens 5027. The optical fiber 40 is a branch optical line which connects one of the multicore optical lines 50 to be measured and the code reading device 5. The optical fiber 40 is connected to the multicore optical line 50 with a connecting means 38. In this embodiment the optical fiber 40 is also a multicore optical fiber having a number of cores equal to the number of core fibers of optical line 50. The connecting means 38 alternatively connects the multicore optical fiber 40 to one of a plurality of the multicore optical lines 50 to be measured.

A light receiving unit 5021 contains a number of light receiving elements 5031 equal to the number of core fibers of the multicore optical line for converting an inputted light to an electrical signal, and an A/D convertor circuit 3035 for converting a signal from the light receiving element 5031 to a digital value and transmitting the digital value to a computer 5022, and a lens 5033 placed in front of every light receiving element 5031. The light receiving element 5031 receives a light from an optical fiber 41 connected to an optical fiber 40 with a fiber coupler 37 and converts the light to an electrical signal. The optical fiber 41 is also a multicore optical fiber having a number of optical core fibers equal to the number of core fibers of a multicore optical line 50 that is the number of core fibers of the optical fiber 40. Each core optical fiber of the optical fiber 41 is led to the light receiving element 5031. Accordingly, the existence of the reflected light at every core optical fiber can be detected. The light receiving elements 5031 are controlled by the timing control circuit 5023, and the light receiving element is operated subsequently from the left hand of the figure, so that the reflected light at the each core optical fiber is subsequently provided to the A/D convertor circuit 5032.

Figure 23:
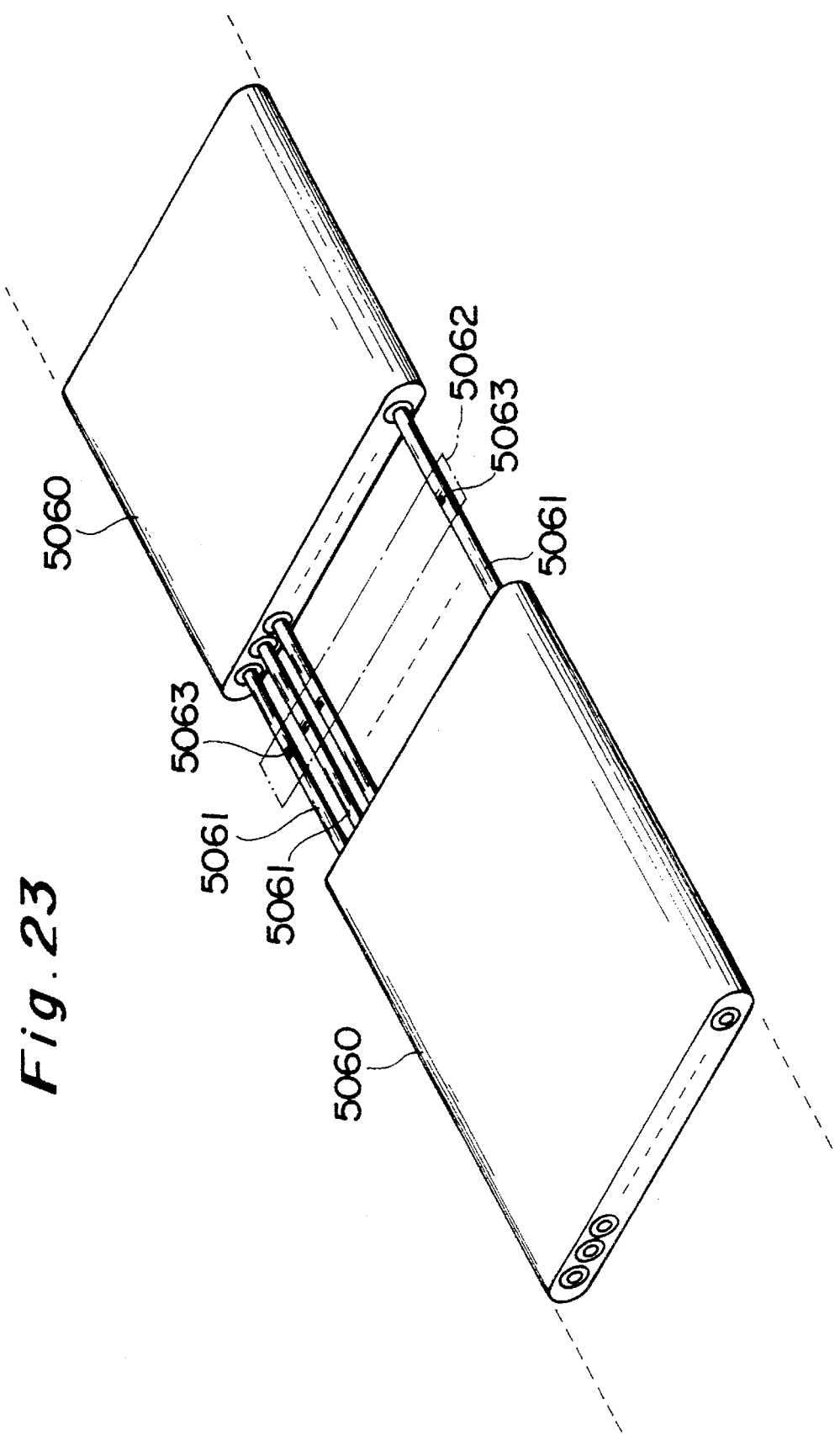
FIG. 23 is a perspective view of an example of an identification code according to the embodiment of the seventh invention.

Unique identification codes 39 are written in each optical line 50. The identification code is formed by placing reflecting parts selectively on core optical fibers of the multicore optical line and changing a combination of the existence of the reflecting part at the core optical fibers for every multicore optical line. FIG. 23 shows an example of the identification code at the multicore tape optical line. Each core optical fiber 5061 of the multicore tape optical line 5060 is exposed to be a part on which the identification code will be made. The reflecting part 5063 is selectively made at this part. The reflecting parts 5063 can be formed as the refractive indices are varied by irradiating to the core optical lines 5061 with a UV ray (Ultra Violet Ray). The reflecting parts 5063 can be also formed by cutting the core optical fibers and inserting an optical filter into the cutting part. In the FIG. 23, identification code part 5063 remains being exposed for easy explanation. This part will be fixed by a board like a silicon chip to maintain a mechanical strength in practice.

Next, a method for reading an identification code 39 will be explained. Here, a multicore optical line is 8-core tape optical fiber. As the detecting light is inputted to the all (eight) core optical fibers of the tape optical fiber to be read, the receiving unit 5021 receives only a reflected light from the core optical fiber having a reflected part. These reflected light is detected at the light receiving element 5031 corresponding to the core optical fiber one by one, and the signal is inputted to the computer 5022 through the A/D convertor circuit 5032. FIG. 24 shows a chart of a detection result. All core optical fibers are numbered 1–8. By the existence of the reflecting part at the each numbered core optical fiber, the detection of the reflected light is made. When the reflected light is detected, a code "1" is given and when the reflected light is not detected, a code "0" is given, so that the 8 bits code information is obtained from the detecting result.

Further, as shown in FIG. 11, the identification code can be written to a branch optical line.

INDUSTRIAL APPLICABILITY

In accordance with the identifying method of the present invention,

① each optical line has a different combination of positions of a plurality of reflecting parts forming an identification code, and the relative positions are detected, ② each optical line has a different combination of reflective wavelengths of a plurality of reflecting parts forming an identification code, and the wavelengths of the reflected lights are measured, ③ each optical line has a different combination of reflective wavelengths and reflectances of a plurality of reflecting parts forming an identification code, and the wavelengths and light intensities of the reflected lights are measured, ④ each optical line has a different reflective wavelength characteristic of reflecting parts forming an identification code, and spectra of the reflected lights are measured, ⑤ each optical line has a different combination of reflective wavelengths and relative positions of a plurality of reflecting parts forming an identification code, and the wavelengths and the relative positions of the reflecting parts are measured based on reflected lights from the identification code, ⑥ each optical line has a different combination of relative positions of a plurality of bending loss parts, and the relative positions are detected, so that the optical line can be easily and accurately identified. Accordingly, the invention is effective to the confirmation of connections in case that a switching is operated at the terminal.

In case that the optical line is a multicore type, reflecting parts can be selectively applied to core optical lines to form an identification code. For all core optical lines, as an existence of a reflected light is measured, the multicore optical line can be easily and accurately identified.

What is claimed is:

1. A method for identifying an optical line, comprising the steps of:

forming a plurality of light-reflecting portions on the optical line, and identifying the optical line according to at least one characteristic of light reflected by said plurality of light-reflecting portions.

2. A method for identifying an optical line according to claim 1, comprising the steps of:

forming the plurality of light-reflecting portions on the optical line as an identification code such that each light-reflecting portion of the plurality of light-reflecting portions has a specific position along the optical line relative to the other light-reflecting portions of the plurality of light-reflecting portions;

detecting the relative positions of the light-reflecting portions along the optical line according to a pattern of light reflected by the plurality of reflecting portions when a detecting light is input into the optical line; and identifying the optical line according to an identification of the relative positions of each light-reflecting portion detected in said detecting step.

3. A method for identifying an optical line according to claim 1, comprising the steps of:

forming the plurality of the light-reflecting portions on the optical line as an identification code, wherein a light reflected from each light-reflecting portion has a specific, respective wavelength such that a specific combination of reflected wavelengths is characteristically associated with the optical line;

detecting a combination of reflected wavelengths when a detecting light is input into the optical line; and identifying the optical line according to the detection of the combination of reflected wavelengths in said detecting step.

4. A method for identifying an optical line according to claim 1, comprising the steps of:

forming the plurality of light-reflecting portions on the optical line as an identification code, wherein each light-reflecting portion has a specific reflectance and wherein a light reflected by each light-reflecting portion has a specific wavelength, such that the plurality of light-reflecting portions characteristically corresponds to a specific combination of reflectances and reflects light having a specific combination of reflected wavelengths;

detecting a wavelength and a light intensity of light reflected from each light-reflecting portion when a detecting light is into the optical line; and identifying the optical line according to the reflected wavelengths and light intensities detected in said detecting step.

5. A method for identifying an optical line according to claim 1, comprising the steps of:

forming the plurality of light-reflecting portions on the optical line as an identification code, a light reflected from each light-reflecting portion having a specific wavelength and each light-reflecting portion having a specific position on the optical line relative to the other light-reflecting portions of the plurality of light-reflecting portions, whereby a specific combination of the reflected wavelengths and relative positions of the plurality of light-reflecting portions is associated with the optical line;

detecting reflected wavelengths and relative positions of the plurality of light-reflecting portions when a detecting light is input into the optical line; and identifying the optical line according to the detection of the combinations of reflected wavelengths and relative positions of the plurality of light-reflecting portions from said detecting step.

6. A method for identifying an optical line according to claim 1, comprising the steps of:

forming the plurality of light-reflecting portions on the optical line as an identification code, each light-reflecting portion of the plurality of light-reflecting portions on the optical line having a specific reflectance characteristic depending on a light wavelength;

detecting a light spectrum reflected from each light-reflecting portion when a detecting light is input into the optical line; and identifying the optical line according to the detection of a combination of reflected light spectra reflected from the plurality of light-reflecting portions on the optical line from said detecting step.

7. A method for identifying an optical line, comprising the steps of:

connecting a branch optical line to the optical line;

forming a plurality of light-reflecting portions on the branch optical line; and identifying the optical line according to at least one characteristic of light reflected by the plurality of light-reflecting portions.

8. A method for identifying an optical line according to claim 7, comprising the steps of:

forming the plurality of light-reflecting portions on the branch optical line in a specific positional arrangement;

detecting a positional arrangement of the plurality of light-reflecting portions according to light reflected from the plurality of light-reflecting portions when a detecting light is input into the optical line; and identifying the optical line according to the detection of the arrangement of the plurality of light-reflecting portions in said detecting step.

9. A method for identifying an optical line according to claim 7, comprising the steps of:

forming the plurality of light-reflecting portions on the branch optical line as an identification code, wherein a light reflected by each light-reflecting portion of said plurality of light-reflecting portions has a specific wavelength such that the plurality of light-reflecting portions on the branch optical line reflect a specific combination of reflected wavelengths; detecting a wavelength of light reflected from each light-reflecting portion of the plurality of light-reflecting portions when a detecting light is input into the optical line; and identifying the optical line according to the detection of the plurality of reflected wavelengths from said detecting step.

10. A method for identifying an optical line according to claim 7, comprising the steps of:

forming the plurality of light-reflecting portions on the branch optical line as an identification code, wherein a light reflected by each light-reflecting portion has a specific wavelength, wherein each light-reflecting portion has a respective reflectance, the branch optical line thereby having a specific combination of reflected wavelengths and light reflectances associated therewith;

detecting a wavelength and an intensity of light reflected from each light-reflecting portion when a detecting light is input into the optical line; and identifying the optical line according to the plurality of wavelengths and light intensities detected in said detecting step.

11. A method for identifying an optical line according to claim 7, comprising the steps of:

forming the plurality of light-reflecting portions on the branch optical line as an identification code, wherein a light reflected by each light-reflecting portion has a specific wavelength, wherein each light-reflecting portion has a specific position on the branch optical line relative to the other light-reflecting portions thereon, a specific combination of reflected wavelengths and a specific combination of relative positions of the light-reflecting portions being thereby associated with the branch optical line;

detecting a reflected wavelength and a relative position corresponding to each light-reflecting portion when a detecting light is input into the optical line; and identifying the optical line according to the combination of reflected wavelengths and relative positions detected in said detecting step.

12. A method for identifying an optical line according to claim 7, comprising the steps of:

forming the plurality of light-reflecting portions on the branch optical line as an identification code, each light-reflecting portion having a specific reflectance characteristic of a wavelength;

detecting a reflected light spectrum reflected from each light-reflecting portion when a detecting light is input into the optical line; and identifying the optical line according to the spectra detected in said detecting step.

13. A method for identification of an optical line according to any one of claims 2, 5, 8, and 11, characterized by detecting the information of the reflected light coming back from the plurality of light-reflecting portions at a timing in dependence on the position thereof when a pulsed detecting light is input into the optical line.

14. A method for identification of an optical line according to any one of claims 1 to 12, wherein each light-reflecting portion is a striped pattern formed by varying the refractive index of the optical line or the branch optical line locally.

15. A method for identification of an optical line according to any one of claims 1 to 12, wherein each light-reflecting portion is an optical filter inserted into the optical line or the branch optical line.

16. A method for identification of an optical line according to any one of claims 1 to 12, wherein:

the optical line consists of a plurality of optical fiber segments, adjacent optical fiber segments being interconnected with a respective optical connector, wherein an optical filter is provided as part of the optical connector.

17. A method for identification of an optical line according to claims 1, 2, 7 or 8, wherein an optical-path difference of reflected light from respective light-reflecting portions is measured by an interferometer, and positions of the light-reflecting portions are detected according to the interferometer measurement.

18. A method for identification of an optical line according to claims 1, 2, 7 or 8, wherein each light-reflecting portion is a notch formed on the optical line or branch optical line.

19. A method for identifying a multicore optical line which includes a bundled plurality of core optical lines, comprising the steps of:

forming a plurality of light-reflecting portions in a specific pattern on at least one of the core optical lines such that the multicore optical line has a specific combination of light-reflecting portions having a characteristic light-reflecting pattern;

detecting light reflected from the plurality of light-reflecting portions when a detecting light is input into the multicore optical line;

identifying the multicore optical line according to the detection of light reflected from the plurality of light-reflecting portions in said detecting step.

20. A method for identifying an optical line, comprising the steps of:

forming a plurality of bending loss parts on the optical line in a specific positional arrangement;

detecting an arrangement of the plurality of bending loss parts according to a light backscattering occurring when a detecting light is input into the optical line; and identifying the optical line according to the arrangement of the plurality of bending loss parts detected in said detecting step.

21. A method for identifying an optical line, comprising the steps of:

connecting a branch optical line to the optical line;

forming a plurality of bending loss parts on the branch optical line in a specific positional arrangement;

detecting the positional arrangement of the plurality of bending loss parts according to a light backscattering occurring when a detecting light is input into the optical line; and identifying the optical line according to the detecting of the positional arrangement of bending loss parts on the branch optical line in said detecting step.

* * * * *